US009490959B2

(12) United States Patent
Kim et al.

(10) Patent No.: US 9,490,959 B2
(45) Date of Patent: Nov. 8, 2016

(54) METHOD FOR TRANSMITTING CHANNEL STATE INFORMATION IN WIRELESS ACCESS SYSTEM AND TERMINAL THEREFOR

(75) Inventors: Jinmin Kim, Anyang-si (KR); Seunghee Han, Anyang-si (KR); Hyunwoo Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 386 days.

(21) Appl. No.: 14/112,191

(22) PCT Filed: Apr. 25, 2012

(86) PCT No.: PCT/KR2012/003178

§ 371 (c)(1),
(2), (4) Date: Oct. 16, 2013

(87) PCT Pub. No.: WO2012/148161

PCT Pub. Date: Nov. 1, 2012

(65) Prior Publication Data

US 2014/0044083 A1 Feb. 13, 2014

Related U.S. Application Data

(60) Provisional application No. 61/479,363, filed on Apr. 26, 2011.

(51) Int. Cl.

*H04L 5/00* (2006.01)
*H04L 1/00* (2006.01)
*H04J 3/14* (2006.01)

(52) U.S. Cl.

CPC ........... *H04L 5/0064* (2013.01); *H04L 1/0026* (2013.01); *H04L 1/0028* (2013.01); *H04L 1/0073* (2013.01); *H04L 5/001* (2013.01); *H04L 5/0057* (2013.01); *H04L 5/0073* (2013.01)

(58) Field of Classification Search

CPC ... H04L 5/0057; H04L 5/0064; H04L 5/001; H04L 5/0073; H04L 1/0028

See application file for complete search history.

(56) References Cited

U.S. PATENT DOCUMENTS

2010/0034114 A1 2/2010 Kim et al.
2012/0039252 A1* 2/2012 Damnjanovic ....... H04L 1/0026 370/328
2012/0120817 A1* 5/2012 Khoshnevis .......... H04L 1/0026 370/252

(Continued)

FOREIGN PATENT DOCUMENTS

JP 2011-30118 A 2/2011
KR 10-2010-0019841 A 2/2010
WO WO 2010/048142 A1 4/2010

OTHER PUBLICATIONS

LG Electronics, "Periodic CSI transmission on PUCCH", 3GPP TSG RAN WG1 #63, R1-106130, Nov. 15-19, 2010, 3 pages.

(Continued)

*Primary Examiner* — Alpus H Hsu
*Assistant Examiner* — Anthony Luo
(74) *Attorney, Agent, or Firm* — Birch, Stewart, Kolasch & Birch, LLP

(57) ABSTRACT

Disclosed is a method for transmitting channel state information (CSI) in a wireless access system supporting carrier aggregation/multiple cells and a terminal therefor. Specifically, the method comprises the steps of: if a collision occurs between starting points of periodic CSI reports for first and second cells, calculating the number of resource elements using the biggest bit size among CSI bit sizes for first and second cells; adjusting the bit of the CSI with the highest priority among the CSIs of the first and second cells to match the biggest bit size; transmitting, to the base station, the adjusted bits of the CSI with the highest priority, which have been mapped to the calculated resource element.

10 Claims, 26 Drawing Sheets

(56) References Cited

U.S. PATENT DOCUMENTS

2012/0140708 A1* 6/2012 Choudhury ......... H04W 72/082 370/328
2012/0220286 A1* 8/2012 Chen ..................... H04W 24/10 455/422.1

OTHER PUBLICATIONS

ITRI, "RRC-Configured Priority for Periodic CQI/PMI/RI Reporting", 3GPP TSG-RAN WG2 Meeting#73, Taipei, Taiwan, Feb. 21-25, 2011, Tdoc R2-111140, pp. 1-3.

* cited by examiner

FIG. 13
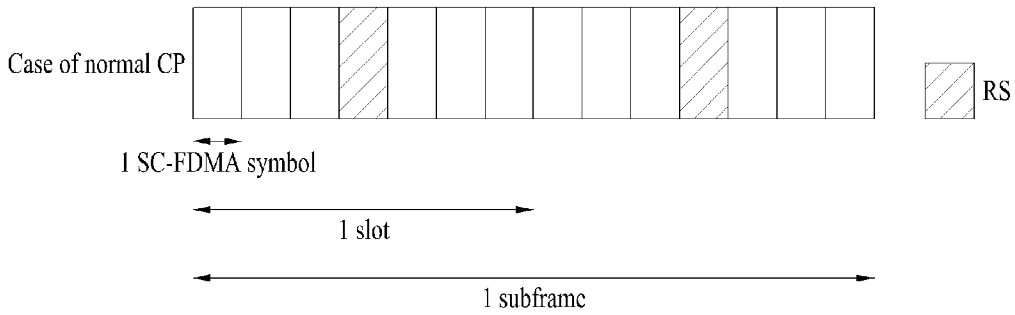
(a)
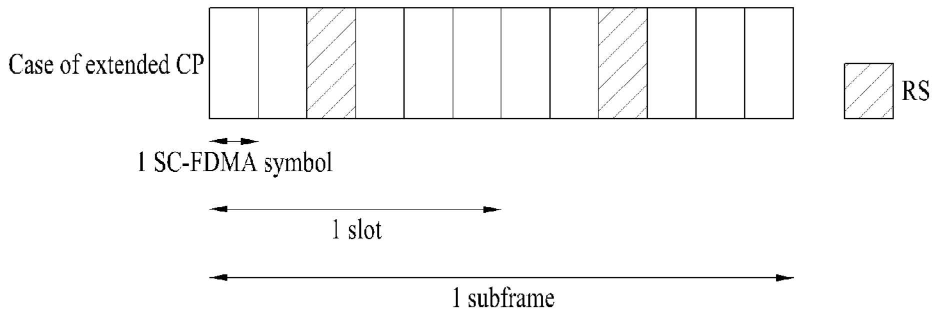
(b)

PUCCH format 1a and 1b structure (Normal CP case)

PUCCH format 1a and 1b structure (Extended CP case)

PUCCH format 2,2a and 2b structure (Normal CP case)

PUCCH format 2,2a and 2b structure (Extended CP case)

FIG. 18

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | $n' = 0$ | | 12 | $n' = 0$ | | 12 |
| 2 | 1 | | 6 | | | 6 | |
| 3 | 2 | 1 | | 13 | 1 | | 13 |
| 4 | 3 | | 7 | | | 7 | |
| 5 | 4 | 2 | | 14 | 2 | | 14 |
| 6 | 5 | | 8 | | | 8 | |
| 7 | 6 | 3 | | 15 | 3 | | 15 |
| 8 | 7 | | 9 | | | 9 | |
| 9 | 8 | 4 | | 16 | 4 | | 16 |
| 10 | 9 | | 10 | | | 10 | |
| 11 | 10 | 5 | | 17 | 5 | | 17 |
| 0 | 11 | | 11 | | | 11 | |

$\Delta_{shift}^{PUCCH} \in \{1,2,3\}$ for normal cyclic prefix; $\{1,2,3\}$ for extended cyclic prefix — Cell-specific Cyclic shift value of CAZAC sequence $\delta_{offset}^{PUCCH} \in \{0,1,\ldots,\Delta_{shift}^{PUCCH} - 1\}$ Cell specific cyclic shift offset $n_{OC}$ Orthogonal sequence index for ACK/NACK $\bar{n}_{OC}$ Orthogonal sequence index for RS $n_{CS}$ Cyclic shift value of a CAZAC sequence $n'$ ACK/NACK resource index used for the channelization in a RB

FIG. 20

☐ PRBs to be used for transmission of PUCCH in slot $n_s$ $$n_{PRB} = \begin{cases} \left\lfloor \frac{m}{2} \right\rfloor & \text{if } (m + n_s \bmod 2) \bmod 2 = 0 \\ N_{RB}^{UL} - 1 - \left\lfloor \frac{m}{2} \right\rfloor & \text{if } (m + n_s \bmod 2) \bmod 2 = 1 \end{cases}$$

- Mapping order :
  From RBs in outer edge to RBs in inner edge
- PUCCH format 2/2a/2b first
- Secondly mixed ACK/NACK and CQI format
- PUCCH format 1/1a/1b

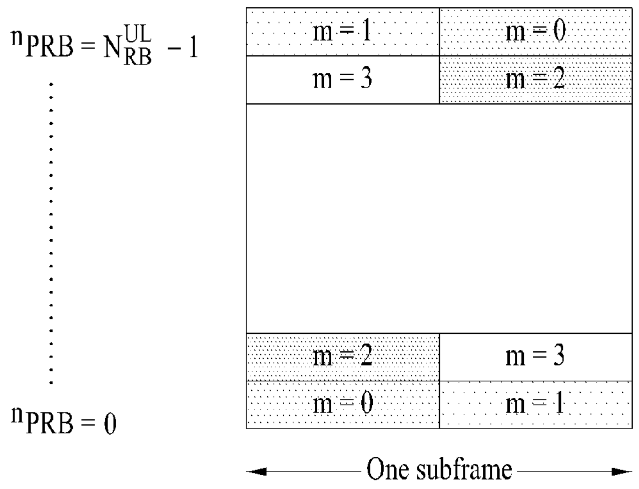

PUCCH Format 1/1a/1b $$m = \begin{cases} N_{RB}^{(2)} & \text{if } n_{PUCCH}^{(1)} < c \cdot N_{cs}^{(1)} / \Delta_{shift}^{PUCCH} \\ \left\lfloor \frac{n_{PUCCH}^{(1)} - c \cdot N_{cs}^{(1)} / \Delta_{shift}^{PUCCH}}{c \cdot N_{sc}^{RB} / \Delta_{shift}^{PUCCH}} \right\rfloor + N_{RB}^{(2)} + \left\lceil \frac{N_{cs}^{(2)}}{8} \right\rceil & \text{otherwise} \end{cases}$$

$$c = \begin{cases} 3 & \text{normal cyclic prefix} \\ 2 & \text{extended cyclic prefix} \end{cases}$$

PUCCH Format 2/2a/2b $$m = \left\lfloor n_{PUCCH}^{(2)} / N_{sc}^{RB} \right\rfloor$$

FIG. 32
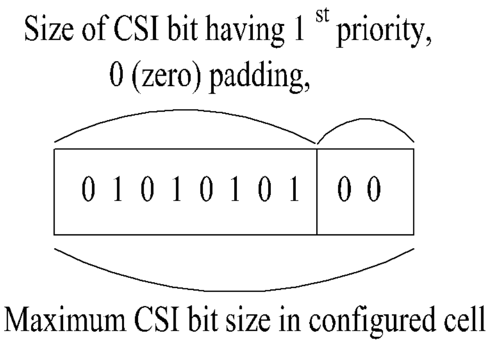
(a)
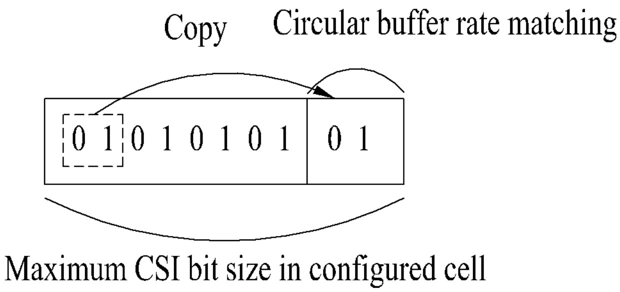
(b)

METHOD FOR TRANSMITTING CHANNEL STATE INFORMATION IN WIRELESS ACCESS SYSTEM AND TERMINAL THEREFOR

CROSS REFERENCE TO RELATED APPLICATIONS

This application is the National Phase of PCT/KR2012/003178 filed on Apr. 25, 2012, which claims priority under 35 U.S.C. §119(e) to U.S. Provisional Application No. 61/479,363 filed on Apr. 26, 2011, all of which are hereby expressly incorporated by reference into the present application.

TECHNICAL FIELD

The present invention relates to a wireless access system, and more particularly, to a method of transmitting a channel state information in a wireless access system supportive of carrier aggregation/multiple cells and user equipment supportive of the same.

BACKGROUND ART

One of important requisites for a next generation wireless access system is to support a high data rate requirement. To this end, many ongoing efforts are made to research and develop various technologies including MIMO (multiple input multiple output), CoMP (cooperative multiple point transmission), Relay and the like.

In a wireless access system of a related art, a single carrier is mainly considered despite setting bandwidths of uplink and downlink to differ from each other. For instance, a wireless communication is provided based on a single carrier as follows. First of all, the number of carriers) configuring each of the uplink and the downlink is 1. Secondly a bandwidth of the uplink and a bandwidth of the downlink are symmetric to each other.

Yet, considering that frequency resources are almost saturated, as a method of securing a wideband bandwidth to meet a higher data rate requirement, basic requirements for enabling scattered bands to respectively operate independent systems are designed to be met and CA (carrier aggregation/multiple cells) in concept of bundling a plurality of bands into a single system is introduced.

In this case, a carrier of a bandwidth unit capable of each independent operation can be named a component carrier (C). In order to support an increasing transmission capacity, the recent 3GPP LTE-A or 802.16m continues to extend its bandwidth up to 20 MHz or higher. In doing so, at least one or more component carriers are aggregated to support a wideband. For instance, if a single component carrier supports a bandwidth of 5 MHz, 10 MHz or 20 MHz, it is able to support a system bandwidth up to maximum 100 MHz in a manner of bundling maximum 5 components.

However, in case that a user equipment reports a channel state information (CSI) on each carrier at a same timing point in a wireless access system supportive of carrier aggregation environment, it may cause a problem that a base station may perform an erroneous decoding on the received channel state information or perform blinding decoding several times.

DISCLOSURE OF THE INVENTION

Technical Task

One object of the present invention is to provide a method of transmitting and receiving channel state information on a plurality of carriers between a user equipment and a base station in a wireless access system supportive of carrier aggregation and apparatus therefor.

Another object of the present invention is to provide a method of transmitting a channel state information and apparatus therefor, which enables a base station to perform decoding accurately despite that a user equipment reports the channel state information on a specific carrier only due to collision between timings of periodic channel state information reports on a plurality of carriers.

A further object of the present invention is to provide a method of transmitting a channel state information and apparatus therefor, which enables a base station to accurately recognize a starting point of data in case of transmitting the channel state information through PUSCH (physical uplink shared channel).

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, in a wireless access system supportive of multiple cells, a method of transmitting a channel state information (CSI) according to one embodiment of the present invention includes the steps of if a timing of a periodic CSI report for a $1^{st}$ cell and a timing of a periodic CSI report for a $2^{nd}$ cell collide with each other, calculating the number of resource elements (REs) using a maximum bit size among a bit size of the CSI for the $1^{st}$ cell and a bit size of the CSI for the $2^{nd}$ cell, adjusting bits of the CSI having a higher priority between the CSI for the $1^{st}$ cell and the CSI for the $2^{nd}$ cell to match the maximum bit size, and transmitting the adjusted bits of the CSI of the higher priority to a base station in a manner of mapping the adjusted bits to the calculated resource elements.

To further achieve these and other advantages and in accordance with the purpose of the present invention, in a wireless access system supportive of multiple cells, a user equipment for transmitting a channel state information (CSI) according to another embodiment of the present invention includes an RF (radio frequency) unit configured to transceive a wireless signal and a processor, if a timing of a periodic CSI report for a $1^{st}$ cell and a timing of a periodic CSI report for a $2^{nd}$ cell collide with each other, calculating the number of resource elements (REs) using a maximum bit size among a bit size of the CSI for the $1^{st}$ cell and a bit size of the CSI for the $2^{nd}$ cell, the processor adjusting bits of the CSI having a higher priority between the CSI for the $1^{st}$ cell and the CSI for the $2^{nd}$ cell to match the maximum bit size, the processor transmitting the adjusted bits of the CSI of the higher priority to a base station in a manner of mapping the adjusted bits to the calculated resource elements.

Preferably, the number (Q') of the resource elements is calculated by a formula in a manner of applying the maximum bit size to O and the formula is represented as follows:

$$Q' = \min\left(\left\lceil \frac{(O+L)\cdot M_{sc}^{PUSCH-initial}\cdot N_{symb}^{PUSCH-initial}\cdot \beta_{offset}^{PUSCH}}{\sum_{r=0}^{C^{(x)}-1} K_r^{(x)}} \right\rceil, M_{sc}^{PUSCH}\cdot N_{symb}^{PUSCH} - \frac{Q_{RI}}{Q_m}\right) \quad \langle\text{Formula}\rangle$$

Preferably, the bits of the CSI having the higher priority are adjusted to match the maximum bit size in a manner of padding bits amounting to a difference from the maximum bit size before and after the bits of the CSI having the higher priority.

Preferably, the bits of the CSI having the higher priority are adjusted to match the maximum bit size in a manner of copying a portion of the bits of the CSI having the higher priority by a difference between the bits of the CSI having the higher priority and the maximum bit size and then adding the copied portion to the bits of the CSI having the higher priority.

Preferably, the CSI having the higher priority is transmitted on PUSCH (Physical Uplink Shared Channel) or PUCCH (Physical Uplink Control Channel).

Preferably, the priority is determined depending on which information selected from the group consisting of CQI (Channel Quality Indication), PMI (Precoding Matrix Indication), RI (Rank Indication) and PTI (Precoder Type Indication) is included in the periodic CSI report.

Advantageous Effects

According to an embodiment of the present invention, channel state information on a plurality of carriers can be smoothly transceived between a user equipment and a base station in a wireless access system supportive of carrier aggregation.

According to an embodiment of the present invention, a base station can perform decoding accurately despite that a user equipment reports channel state information on a specific carrier only due to collision between timings of periodic channel state information reports on a plurality of carriers.

According to an embodiment of the present invention, in case that channel state information is transmitted on PUSCH (physical uplink shared channel), a base station can accurately recognize a starting point of data.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 13 is a diagram of a structure of a subframe for transmitting DMRS (demodulation reference signal).

FIG. 18 is a diagram to describe ACK/NACK channelization for PUCCH format 1a and 1b.

FIG. 20 is a diagram for allocation of physical resource block (PRB).

FIG. 32 is a diagram of a CSI bit size adjusting method according to one embodiment of the present invention.

BEST MODE FOR INVENTION

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts.

First of all, techniques explained in the following description may be applicable to various kinds of wireless access systems. For example, the access system may include one of CDMA (code division multiple access), FDMA (frequency division multiple access), TDMA (time division multiple access), OFDMA (orthogonal frequency division multiple access), SC-FDMA (single carrier frequency division multiple access) and the like. CDMA may be implemented by such a wireless or radio technology as UTRA (universal terrestrial radio access), CDMA 2000 and the like. TDMA may be implemented with such a wireless technology as GSM (Global System for Mobile communications), GPRS (General Packet Radio Service), EDGE (Enhanced Data Rates for GSM Evolution) and the like. OFDMA may be implemented with such a wireless technology as IEEE (Institute of Electrical and Electronics Engineers) 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (DL) and SC-FDMA in uplink (UL). And, LTE-A (LTE-Advanced) is an evolved version of 3GPP LTE.

For clarity, the following description mainly concerns a case of 3GPP LTE/LTE-A, by which the technical features of the present invention may be non-limited.

Figure 1:
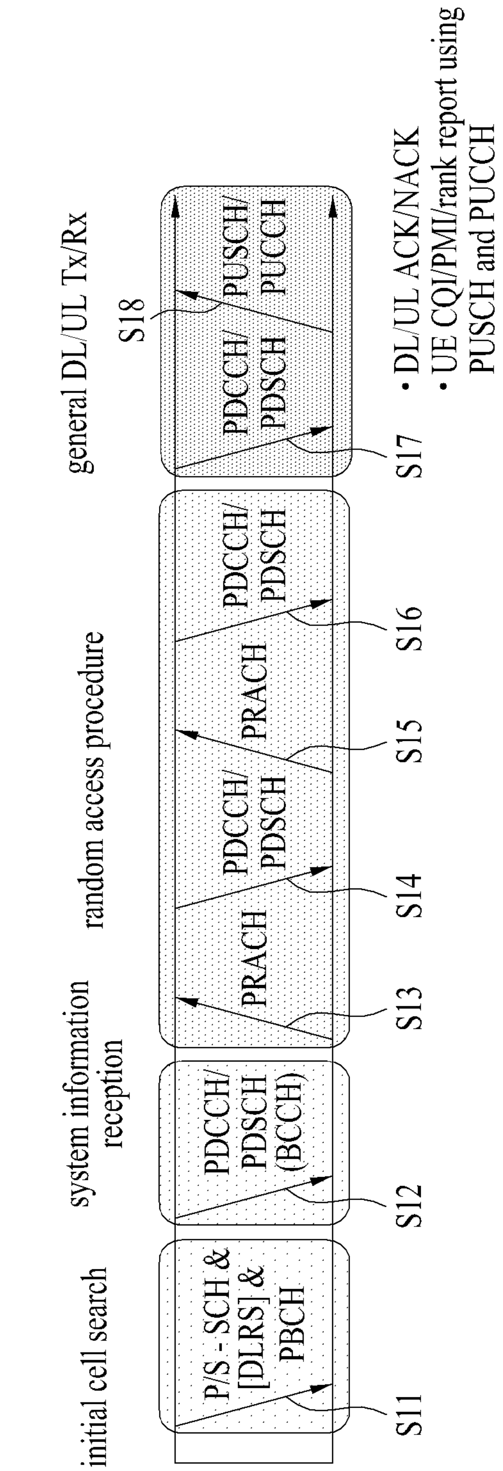
FIG. 1 is a diagram to describe physical channels used for 3GPP LTE system and a signal transmission using the same.

Generals of 3GPP LTE/LTE-A to which the Invention is Applicable 1.1. System Generals FIG. 1 is a diagram to describe physical channels used for 3GPP LTE system and a signal transmission using the same.

If a power of a user equipment in power-off state is turned on again or the user equipment enters a new cell, the user equipment may perform an initial cell search job for matching synchronization with a base station and the like [S11]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel from the base station and may be then obtain intra-cell broadcast information. Meanwhile, in the initial cell search step, the user equipment receives a downlink reference signal (DL RS) and is then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S12].

Thereafter, in order to complete an access to the base station, the user equipment may perform a random access procedure on the base station [S13 to S16]. To this end, the user equipment may transmit a preamble on a physical random access channel (PRACH) [S13] and may then receive a response message via a physical downlink control channel (PDCCH) and a corresponding physical downlink share channel in response to the preamble [S14]. In case of a contention based random access, the user equipment can perform a contention resolution procedure such as a transmission S15 of an additional physical random access channel signal and a channel reception S16 of a physical downlink control channel signal and a corresponding physical downlink shared channel signal.

Having performed the above mentioned steps, the user equipment can perform a reception S17 of a physical downlink control channel signal and/or a physical downlink shared channel signal and a transmission S18 of a PUSCH (physical uplink shared channel) signal and/or a PUCCH (physical uplink control channel) signal 5108 as a general uplink/downlink signal transmitting procedure.

A control information transmitted by a user equipment to a base station is generally called an uplink control information (UCI). The UCI may include information on HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like.

Although UCI is generally transmitted on PUCCH by periods in LTE system, in case that both control information and traffic data should be transmitted simultaneously, the UCI may be transmitted on PUSCH. Moreover, the UCI may be aperiodically transmitted on PUSCH in response to a request/instruction made by a network.

Figure 2:
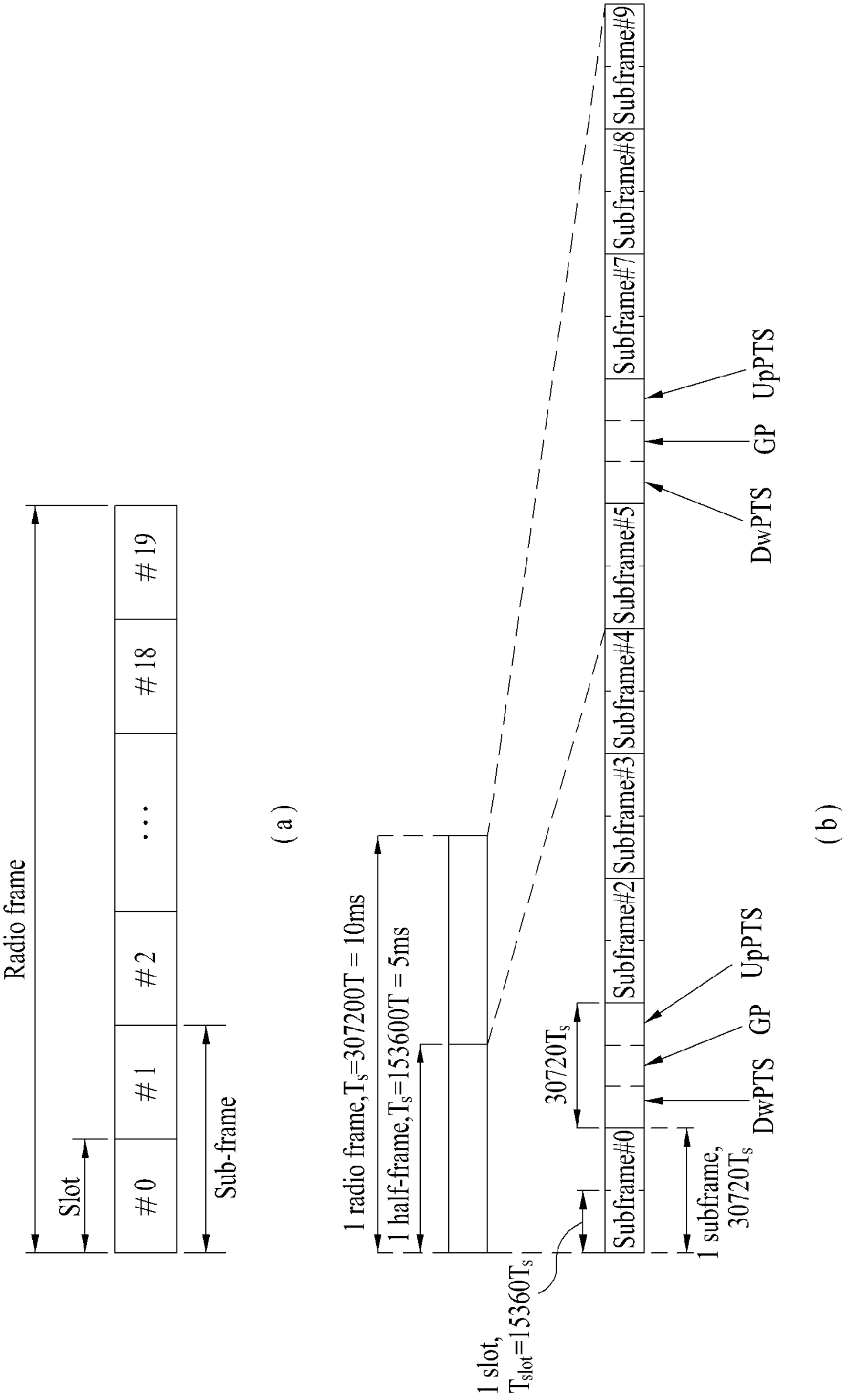
FIG. 2 is a diagram for a structure of a radio frame in 3GPP LTE.

FIG. 2 shows structures of radio frames in 3GPP LTE.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2 (*a*) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP system uses OFDMA in downlink, OFDM symbol is provided to indicate one symbol period. The OFDM symbol may be named SC-FDMA symbol or symbol period. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 2 (*b*) is a diagram for a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
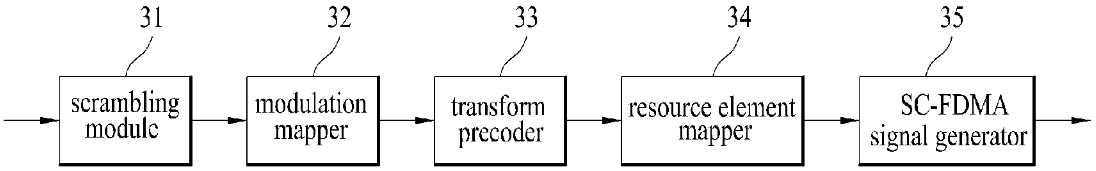
FIG. 3 is a diagram of a signal processing method for a user equipment to transmit an uplink signal.

FIG. 3 is a diagram for describing a signal processing process for a user equipment to transmit an uplink (UL) signal.

First of all, in order to transmit a UL signal, a scrambling module 31 of a user equipment may scramble a transmission signal using a UE-specific scrambling signal. This scrambled signal is inputted to a modulating mapper 32 and is then modulated into a complex symbol by BPSK (binary phase shift keying), QPSK (quadrature phase shift keying) or 16/64 QAM (quadrature amplitude modulation) in accordance with a type and/or channel state of the transmission signal. Subsequently, the complex symbol is processed by a transform precoder 33 and is then inputted to a resource element mapper 34. In this case, the resource element mapper 34 can map the complex symbol into a time-frequency resource element that will be actually used for a transmission. This processed signal is inputted to an SC-FDMA signal generator 350 and may be then transmitted to a base station via antenna.

Figure 4:
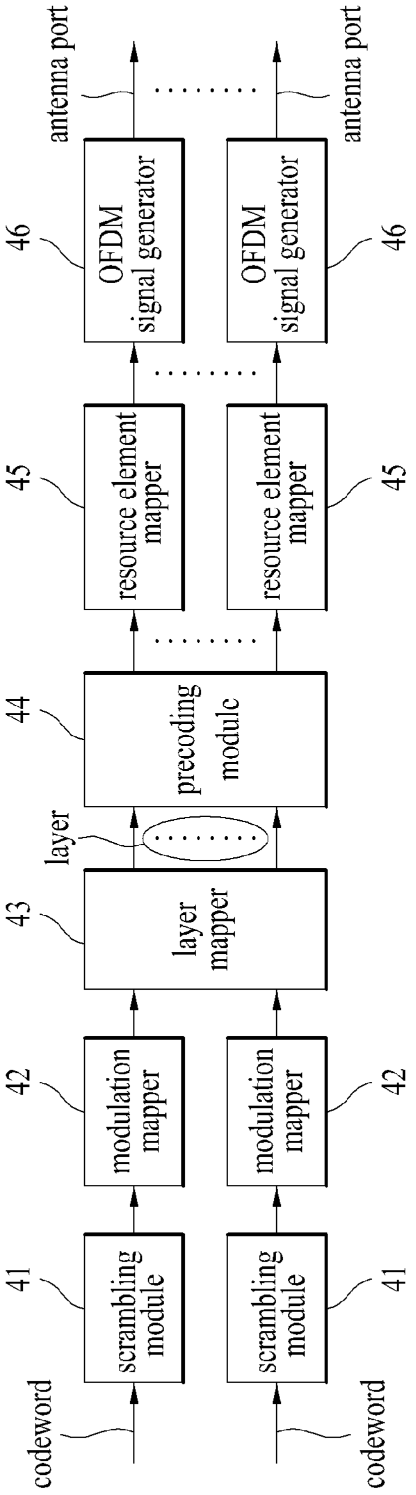
FIG. 4 is a diagram for describing a signal processing process for a base station to transmit a downlink signal.

FIG. 4 is a diagram for describing a signal processing process for a base station to transmit a downlink (DL) signal.

In 3GPP LTE system, a base station may be able to transmit at least one codeword in DL. Hence, each of the at least one codeword can be processed into a complex symbol by a scrambling module 41 and a modulating mapper 42 like the uplink shown in FIG. 3. The complex symbol may be then mapped to a plurality of layers by a layer mapper 43. Each of a plurality of the layers may be then assigned to each transmitting antenna by being multiplied by a prescribed precoding matrix selected by a precoding module 44 in accordance with a channel state. A per-antenna transmission signal processed in the above manner is mapped to a time-frequency resource element, which will be used for a transmission, by each resource element mapper 45, enters an OFDM (orthogonal frequency division multiple access) signal generator 46, and may be then transmitted via a corresponding antenna.

Since OFDMA scheme uses multiple subcarriers, it is disadvantageous in that PAPR (peak-to-average power ratio) is relatively high due to the overlapping of subcarriers. Therefore, as mentioned in the foregoing description with reference to FIG. 3 and FIG. 4, in order to complement the disadvantage of the high PAPR in a user equipment for which power efficiency is important, a DL signal transmission uses OFDMA scheme and a UL signal transmission uses SC-FDMA (single carrier-frequency division multiple access) scheme.

Figure 5:
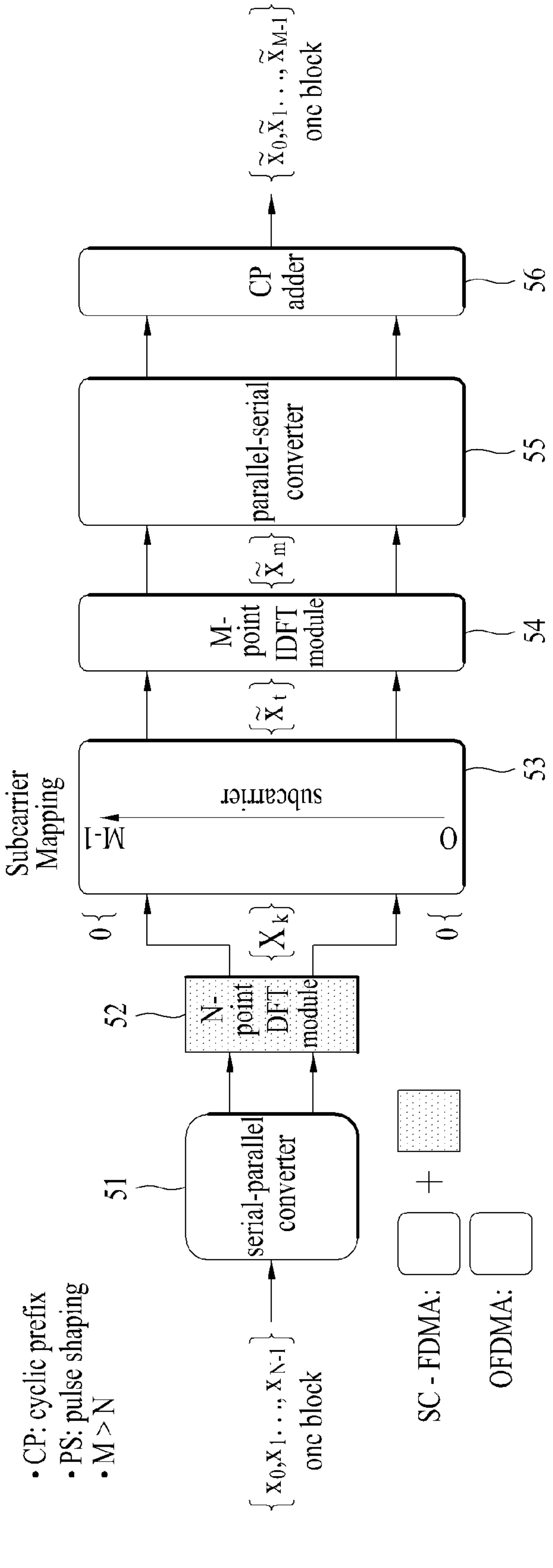
FIG. 5 is a diagram for comparing SC-FDAM scheme to OFDMA scheme.

FIG. 5 is a diagram for comparing SC-FDMA scheme and OFDMA scheme to each other.

Referring to FIG. 5, a user equipment for a UL signal transmission and a base station for a DL signal transmission are identical to each other in including a serial-to-parallel converter 51, a subcarrier mapper 53, an M-point IDFT module 54 and a CP (cyclic prefix) adding module 56.

Yet, a user equipment for transmitting a signal by SC-FDMA scheme may additionally include an N-point DFT module 52. N data symbols generated from the serial-to-parallel converter 51 are inputted to the N-point DFT module 52. In doing so, the N data symbol components are spread over the assigned band. Subsequently, assuming that a band corresponding to N subcarriers are assigned to a user equipment, an output signal of the N-point DFT module 52 is mapped to an assigned position in a whole UL system band (i.e., an input of the M-point IDFT module). In particular, the N-point DFT module 52 enables a transmission signal to have a single carrier property by canceling out an IDFT processing effect of the M-point IDFT module 54.

Figure 6:
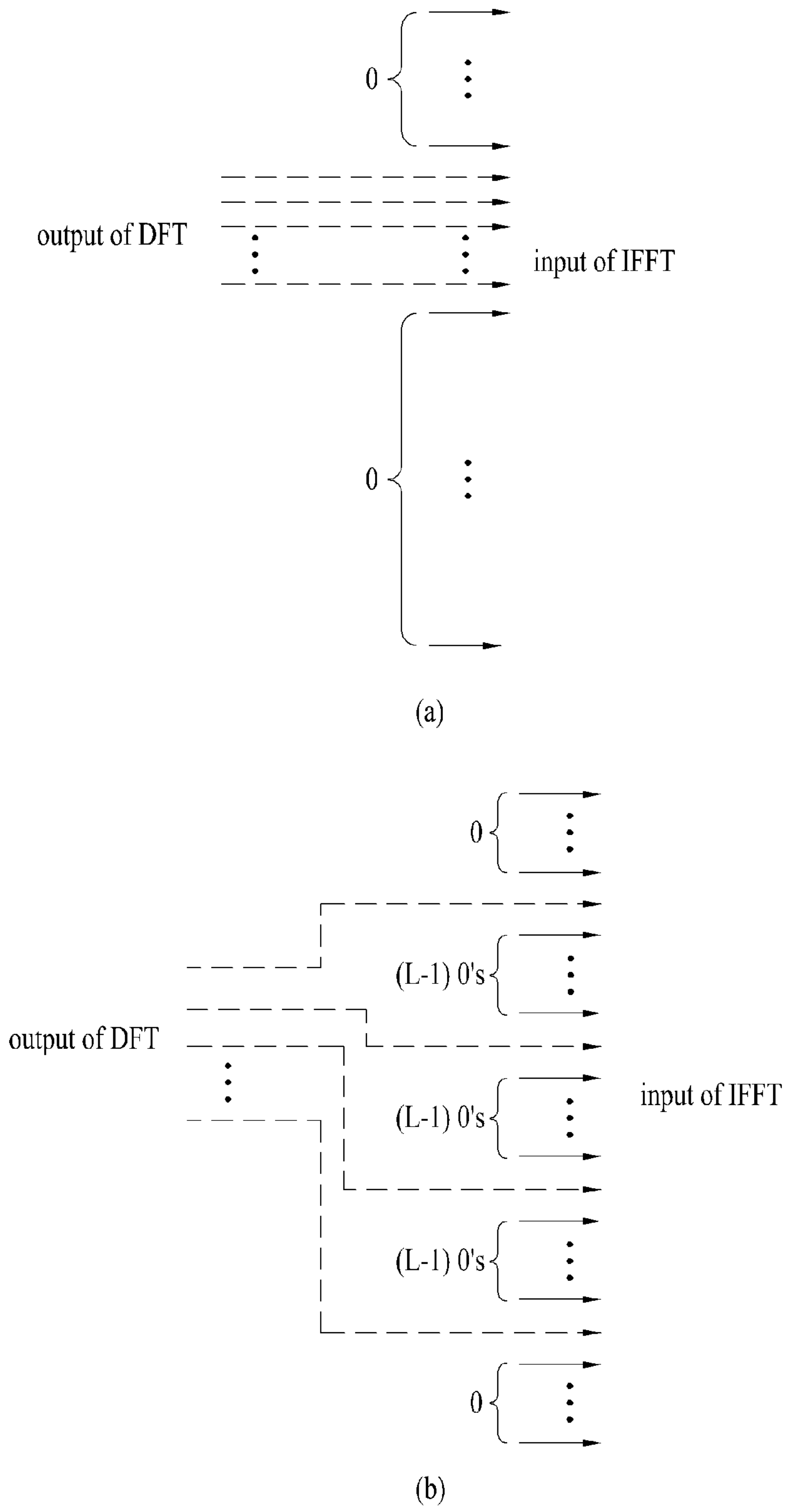
FIG. 6 is a diagram for describing a signal mapping scheme in frequency domain to meet a single carrier property in the frequency domain.

FIG. 6 is a diagram for describing a signal mapping scheme in frequency domain to meet a single carrier property in the frequency domain.

FIG. 6 (*a*) shows a localized mapping scheme and FIG. 6 (*b*) shows a distributed mapping scheme. In particular, the localized mapping scheme is defined by 3GPP LTE system.

According to clustered SC-FDMA as a modified form of SC-FDMA, DFT process output samples in a subcarrier mapping process are divided into subgroups and the subgroups are discontinuously mapped to subcarrier regions, respectively, Occasionally, the clustered SC-FDMA may include a filtering process and a cyclic extension process. In this case, the subgroup may be named a cluster. And, the cyclic extension may mean that a guard interval longer than a maximum delay spread of a channel is inserted between contiguous symbols to prevent mutual inter-symbol interference (ISI) while each subcarrier symbol is carried on a multi-path channel.

Figure 7:
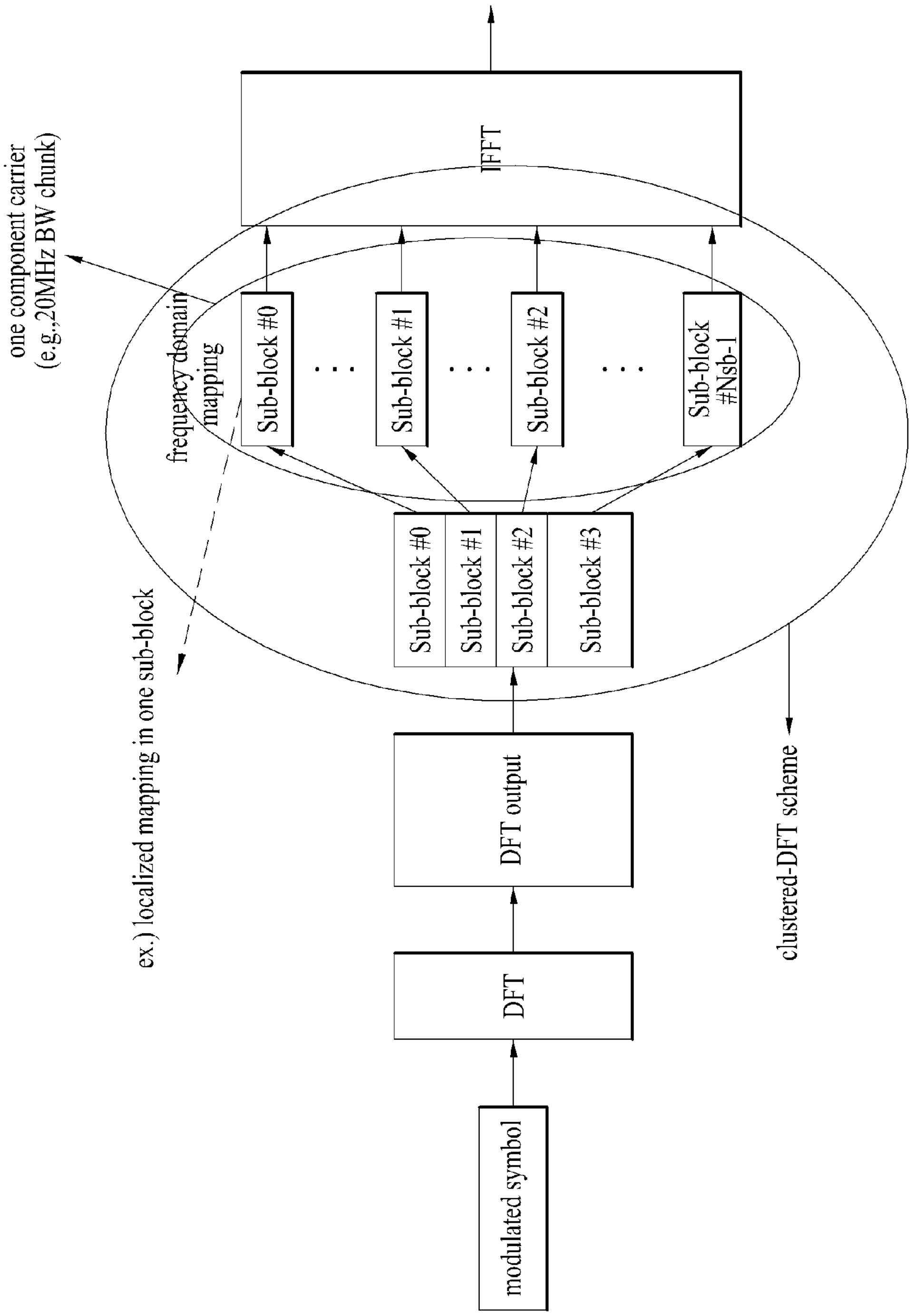
FIG. 7 is a diagram of a signal processing process for mapping DFT process output samples to a single carrier in clustered SC-FDMA.
Figure 8:
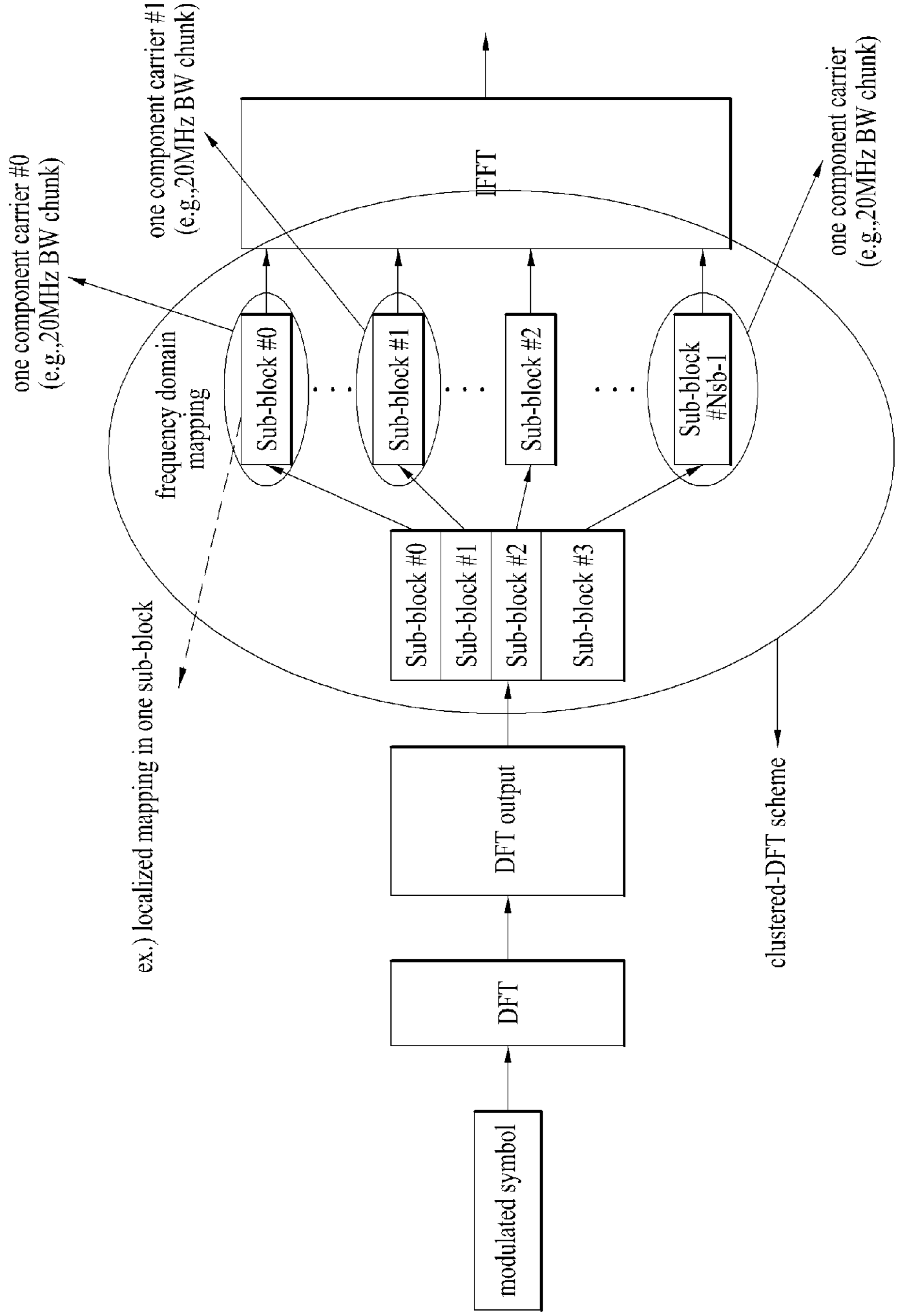
FIG. 8 and FIG. 9 are diagrams of a signal processing process for mapping DFT process output samples to multicarrier in clustered SC-FDMA.
Figure 9:
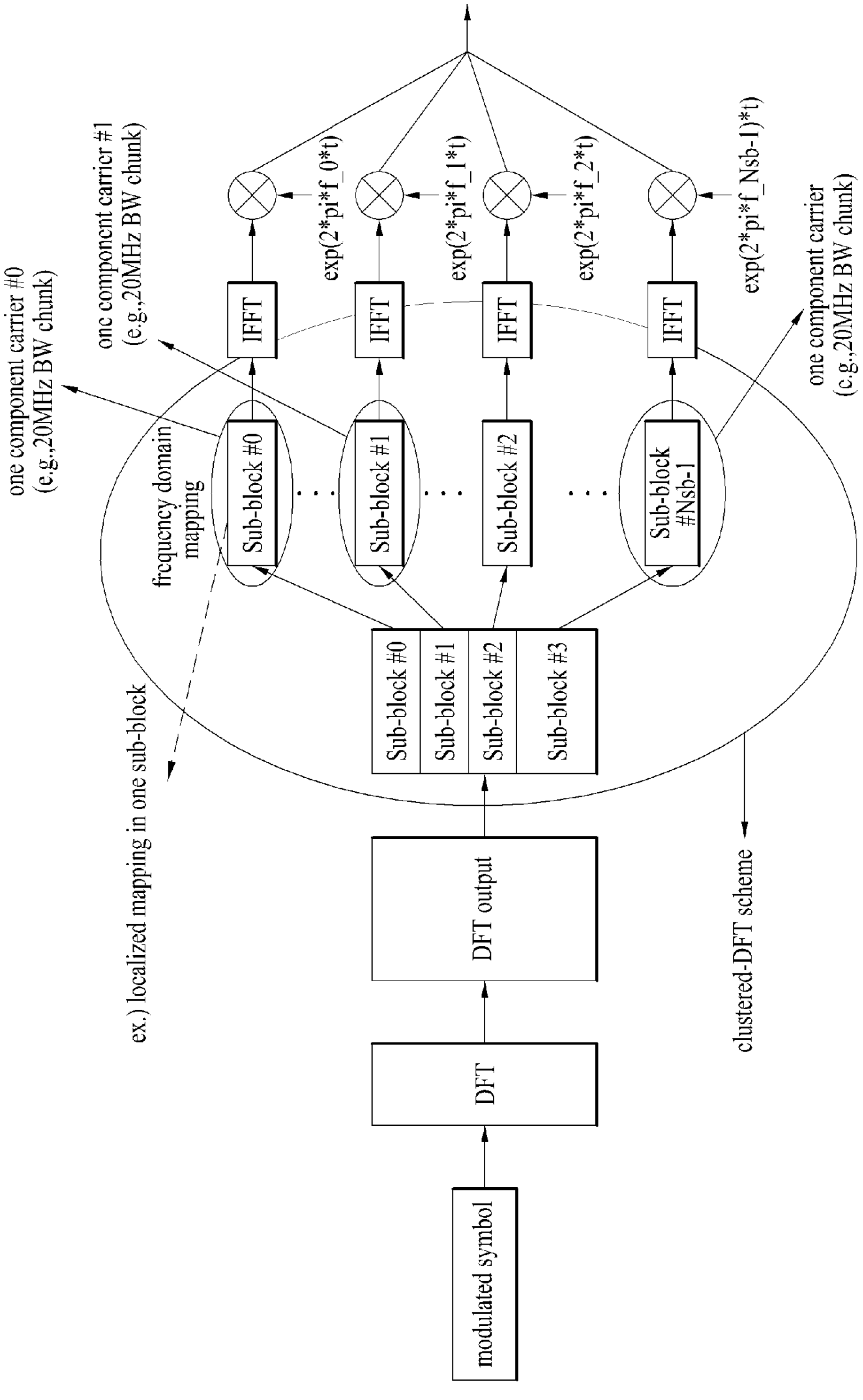

FIG. 7 is a diagram of a signal processing process for mapping DFT process output samples to a single carrier in the clustered SC-FDMA. FIG. 8 and FIG. 9 are diagrams of a signal processing process for mapping DFT process output samples to a multicarrier in the clustered SC-FDMA.

In particular, FIG. 7 shows an example of applying the clustered SC-FDMA in an intra-carrier and FIG. 8 and FIG. 9 show examples of applying the clustered SC-FDMA in an inter-carrier. Moreover, FIG. 8 shows a case of generating a signal via a single IFFT block if a subcarrier spacing between component carriers contiguous to each other is aligned in a situation that component carriers contiguous to each other are allocated in a frequency domain. And, FIG. 9 shows a case of generating a signal via a plurality of IFFT blocks because component carriers are not contiguous to each other in a situation that component carriers are non-contiguously allocated in a frequency domain.

The segmented SC-FDMA may simply extend a DFT spreading of the conventional SC-FDMA and a frequency subcarrier mapping configuration of IFFT because a configuration related between DFT and IFFT has a one-to-one relation by applying IFFTs of which number is equal to an arbitrary number of DFTs. This is called NxSCFDMA or N×DFT-s-OFDMA, which may be named segmented SC-FDMA for clarity of the following description.

Figure 10:
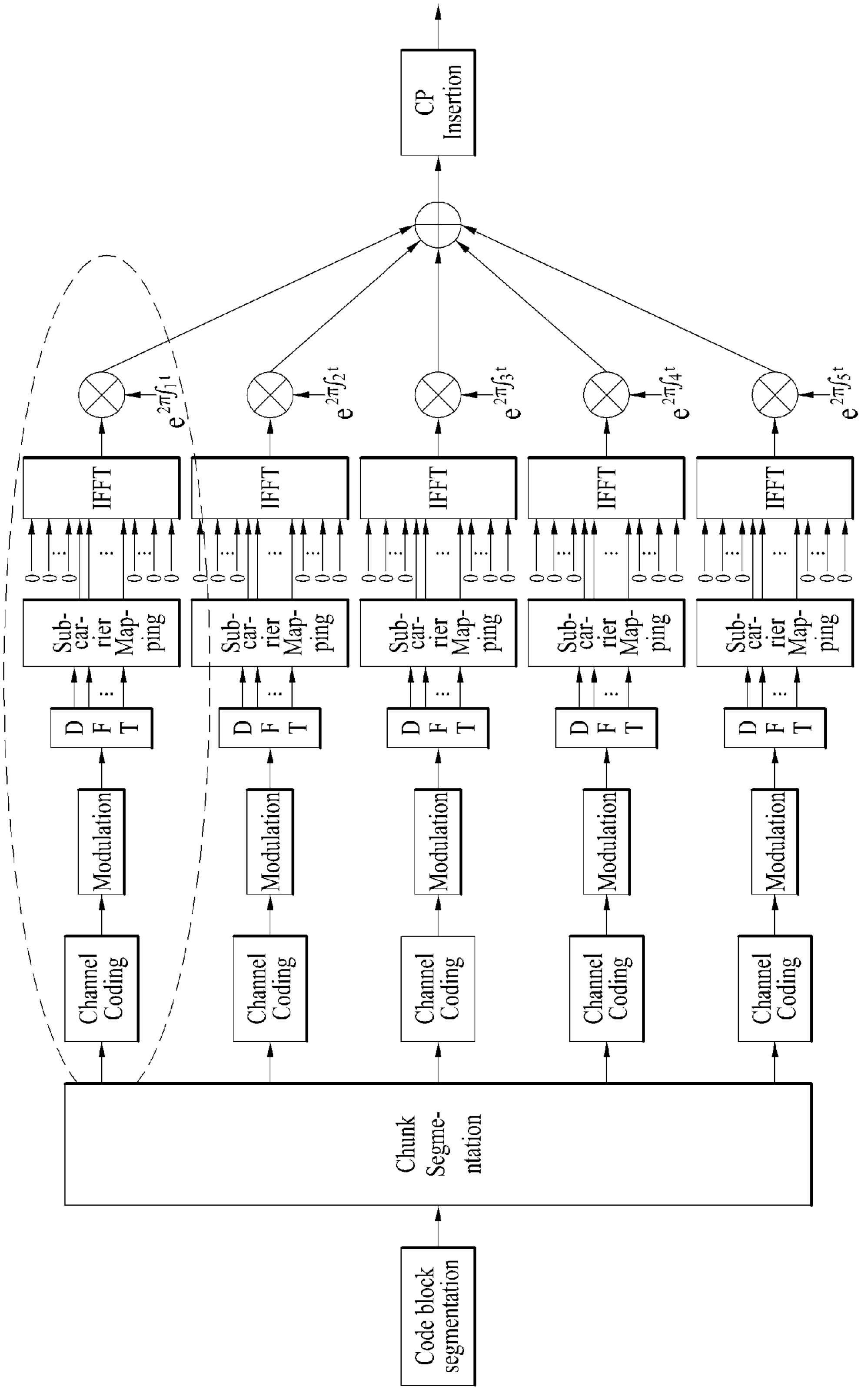
FIG. 10 is a diagram of a signal processing process in segmented SC-FDMA.

FIG. 10 is a diagram of a signal processing process in the segmented SC-FDMA. Referring to FIG. 10, the segmented SC-FDMA may be characterized in performing a DFP process by a group unit in a manner of binding all time-domain modulated symbols into N groups (where, N is an integer greater than 1) to mitigate a single carrier property condition.

Figure 11:
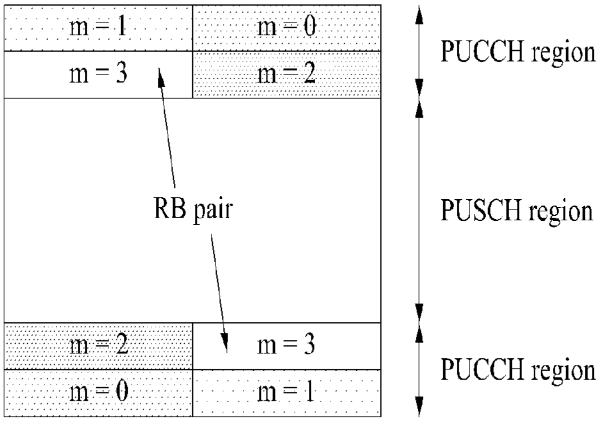
FIG. 11 is a diagram for a structure of an uplink subframe.

FIG. 11 shows a structure of an uplink subframe.

Referring to FIG. 11, a UL (uplink) subframe may include a plurality of slots (e.g., 2 slots). Each of the slots may include a different number of SC-FDMA symbols depending on a length of a cyclic prefix. For instance, in case of a normal cyclic prefix, a slot may include 7 SC-FDMA symbols. The UL subframe may be divided into a control region and a data region in a frequency domain. PUCCH is assigned to the control region to carry UL control information. PUSCH is assigned to the data region to carry data. In order to maintain a single carrier property, one user equipment does not transmit PUCCH and PUSCH at the same time. For PUCCH of one user equipment, an RB pair (e.g., m=0, 1, 2, 3) (e.g., RB pair at frequency mirrored position) is assigned to both ends of a data region in a subframe on a frequency axis. RBs belonging to the RB pair occupy different subcarriers in each of 2 slots. This is called that the RB pair assigned to the PUCCH performs frequency hopping on a slot boundary.

Figure 12:
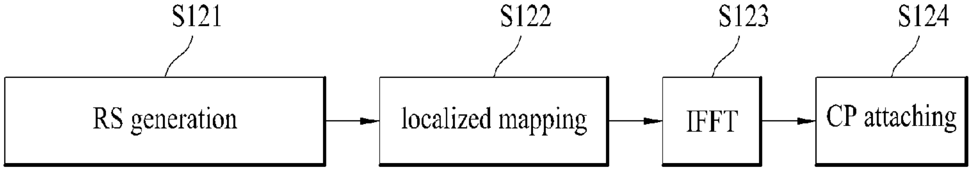
FIG. 12 is a diagram to describe a signal processing process for transmitting a reference signal (hereinafter abbreviated RS) in uplink (UL).

FIG. 12 is a diagram for describing a signal processing process for transmitting a reference signal (hereinafter abbreviated RS) in UL. First of all, data is transformed by a DFT precoder into a frequency-domain signal, frequency-mapped, and then transmitted via IFFT. Yet, an RS is directly generated in frequency domain by skipping a step of entering a DFT precoder [S121], enters a localized mapping step S122, an IFFT step S123 and a CP (cyclic prefix) attaching step S124 sequentially, and is then transmitted.

FIG. 13 is a diagram for a structure of a subframe to transmit DMRS (demodulation-reference signal).

FIG. 13 (*a*) is a diagram for a structure of a subframe to transmit DMRS in case of a normal CP. And, FIG. 13 (*b*) is a diagram for a structure of a subframe to transmit DMRS in case of an extended CP. Referring to FIG. 13 (*a*), DMRS is carried on $4^{th}$ SC-FDMA symbol and $11^{th}$ SC-FDMA symbol in a normal cyclic prefix. Referring to FIG. 13 (*b*), DMRS is carried on $3^{rd}$ SC-FDMA symbol and $9^{th}$ SC-FDMA symbol.

1.2. PUCCH (Physical Uplink Control Channel)

PUCCH may include the following formats to transmit control information.

(1) Format 1: On-Off keying (OOK) modulation, used for SR (Scheduling Request)

(2) Format 1a & 1b: Used for ACK/NACK transmission

1) Format 1a: BPSK ACK/NACK for 1 codeword

2) Format 1b: QPSK ACK/NACK for 2 codewords (3) Format 2: QPSK modulation, used for CQI transmission (4) Format 2a & Format 2b: Used for simultaneous transmission of CQI and ACK/NACK Table 1 shows a modulation scheme according to PUCCH format and the number of bits per subframe. Table 2 shows the number of reference signals (RS) per slot according to PUCCH format. Table 3 shows SC-FDMA symbol location of RS (reference signal) according to PUCCH format. In Table 1, PUCCH format 2a and PUCCH format 2b correspond to a case of normal cyclic prefix (CP).

TABLE 1

| PUCCH format | Modulation scheme | No. of bits per subframe, Mbit |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 2

| PUCCH format | Normal CP | Extended CP |
|---|---|---|
| 1, 1a, 1b | 3 | 2 |
| 2 | 2 | 1 |
| 2a, 2b | 2 | N/A |

TABLE 3

| | SC-FDMA symbol location of RS | |
|---|---|---|
| PUCCH format | Normal CP | Extended CP |
| 1, 1a, 1b | 2, 3, 4 | 2, 3 |
| 2, 2a, 2b | 1, 5 | 3 |

Figure 14:
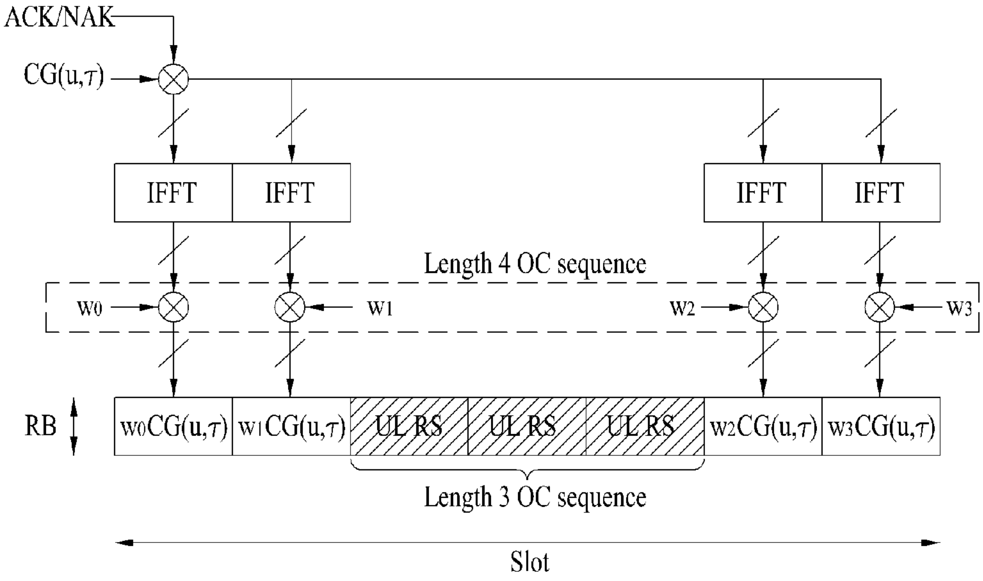
FIG. 14 shows PUCCH format 1a and 1b in case of a normal cyclic prefix.
Figure 15:
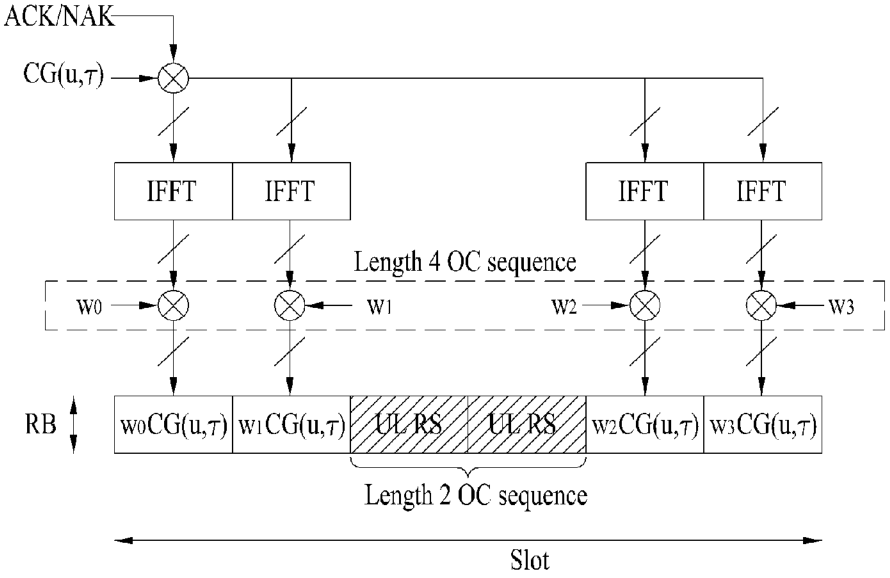
FIG. 15 shows PUCCH format 1a and 1b in case of an extended cyclic prefix.

FIG. 14 shows PUCCH formats 1a and 1b in case of a normal cyclic prefix. And, FIG. 15 shows PUCCH formats 1a and 1b in case of an extended cyclic prefix. According to the PUCCH formats 1a and 1b, control information of the same content is repeated in a subframe by slot unit. In each user equipment, ACK/NACK signal is transmitted on a different resource constructed with a different cyclic shift (CS) (frequency domain code) and an orthogonal cover (OC) or orthogonal cover code (OCC) (time domain spreading code) of CG-CAZAC (computer-generated constant amplitude zero auto correlation) sequence. For instance, the OC includes Walsh/DFT orthogonal code. If the number of CS and the number of OC are 6 and 3, respectively, total 18 user equipments may be multiplexed within the same PRB (physical resource block) with reference to a single antenna. Orthogonal sequences w0, w1, w2 and w3 may be applicable to a random time domain (after FFT modulation) or a random frequency domain (before FFT modulation).

For persistent scheduling with SR, ACK/NACK resource constructed with CS, OC and PRB (physical resource block) may be allocated to a user equipment through RRC (radio resource control. For non-persistent scheduling with dynamic ACK/NACK, the ACK/NACK resource may be implicitly allocated to a user equipment using a smallest CCE index of PDCCH corresponding to PDSCH.

Length-4 orthogonal sequence (OC) and length-3 orthogonal sequence for PUCCH format 1/1a/1b are shown in Table 4 and Table 5, respectively.

TABLE 4

| Sequence index $n_{oc}(n_s)$ | Orthogonal sequences $[w(0) \ldots w(N_{SF}^{PUCCH}-1)]$ |
|---|---|
| 0 | [+1 +1 +1 +1] |
| 1 | [+1 −1 +1 −1] |
| 2 | [+1 −1 −1 +1] |

TABLE 5

| Sequence index $n_{oc}(n_s)$ | Orthogonal sequences $[w(0) \ldots w(N_{SF}^{PUCCH}-1)]$ |
|---|---|
| 0 | [1 1 1] |
| 1 | $[1\ e^{j2\pi/3}\ e^{j4\pi/3}]$ |
| 2 | $[1\ e^{j4\pi/3}\ e^{j2\pi/3}]$ |

Orthogonal sequence (OC) $[\overline{w}(0) \ldots \overline{w}(N_{RS}^{PUCCH}-1)]$ for a reference signal in PUCCH format 1/1a/1b is shown in Table 6.

TABLE 6

| Sequence index $\overline{n}_{oc}(n_s)$ | Normal cyclic prefix | Extended cyclic prefix |
|---|---|---|
| 0 | [1 1 1] | [1 1] |
| 1 | $[1\ e^{j2\pi/3}\ e^{j4\pi/3}]$ | [1 −1] |
| 2 | $[1\ e^{j4\pi/3}\ e^{j2\pi/3}]$ | N/A |

Figure 16:
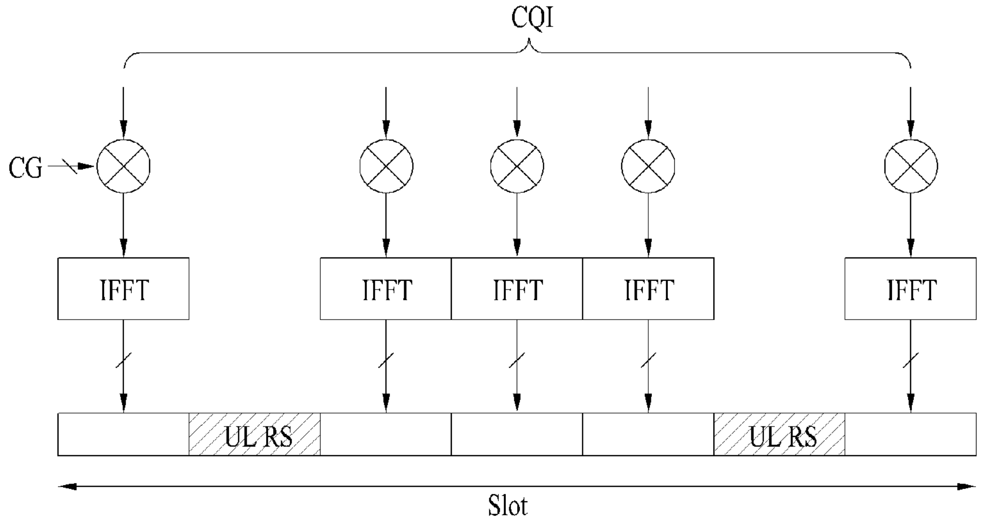
FIG. 16 is a diagram of PUCCH format 2/2a/2b in case of a normal cyclic prefix.
Figure 17:
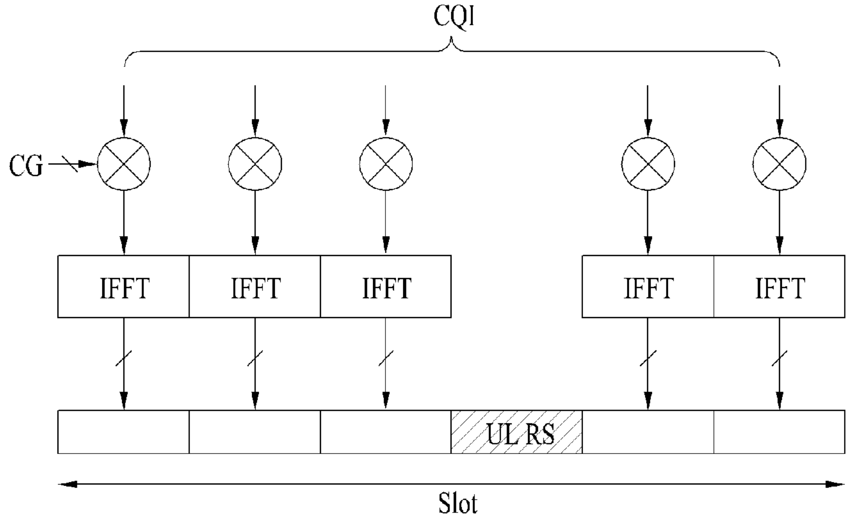
FIG. 17 is a diagram of PUCCH format 2/2a/2b in case of an extended cyclic prefix.

FIG. 16 shows PUCCH format 2/2a/2b in case of a normal cyclic prefix. And, FIG. 17 shows PUCCH format 2/2a/2b in case of an extended cyclic prefix. Referring to FIG. 16 and FIG. 17, in case of a normal CP, a subframe is constructed with 10 QPSK data symbols as well as RS symbol. Each QPSK symbol is spread in a frequency domain by CS and is then mapped to a corresponding SC-FDMA symbol. SC-FDMA symbol level CS hopping may be applied to randomize inter-cell interference. The RS may be multiplexed by CDM using a cyclic shift. For instance, assuming that the number of available CSs is 12, 12 user equipments may be multiplexed in the same PRB. For instance, assuming that the number of available CSs is 6, 6 user equipments may be multiplexed in the same PRB. In brief, a plurality of user equipments in PUCCH format 1/1a/1b and PUCCH format 2/2a/2b may be multiplexed by 'CS+OC+PRB' and 'CS+PRB', respectively.

FIG. 18 is a diagram of ACK/NACK channelization for PUCCH formats 1a and 1b. In particular, FIG. 18 corresponds to a case of '$\Delta_{shift}^{PUCCH}=2$'.

Figure 19:
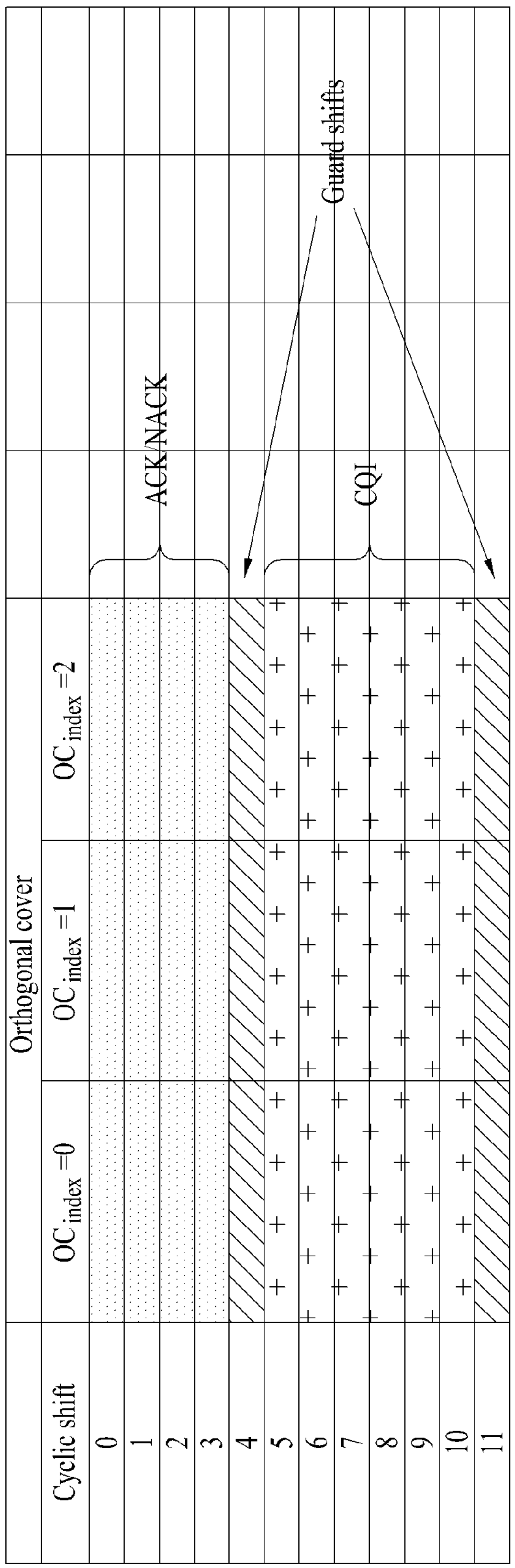
FIG. 19 is a diagram of channelization for a hybrid structure of PUCCH format 1a/1b and PUCCH format 2/2a/2b.

FIG. 19 is a diagram of channelization for a hybrid structure of PUCCH format 1/1a/1b and PUCCH format 2/2a/2b.

Cyclic shift (CS) hopping and orthogonal cover (OC) remapping may be applicable in a following manner (1) Symbol-based cell-specific CS hopping for randomization of inter-cell interference (2) Slot level CS/OC remapping 1) For inter-cell interference randomization 2) Slot based access for mapping between ACK/NACK channel and resource (k)

Meanwhile, resource $n_r$ for PUCCH format 1/1a/1b may include the following combinations.

(1) CS (=equal to DFT orthogonal code at symbol level) ($n_{cs}$)

(2) OC (orthogonal cover at slot level) ($n_{oc}$)

(3) Frequency RB (Resource Block) ($n_{rb}$)

If indexes indicating CS, OC and RB are set to $n_{cs}$, $n_{os}$, $n_{rb}$, respectively, a representative index $n_r$ may include $n_{cs}$, $n_{oc}$ and $n_{rb}$. In this case, the $n_r$ may meet the condition of '$n_r=(n_{cs}, n_{oc}, n_{rb})$'.

The combination of CQI, PMI, RI, CQI and ACK/NACK may be delivered through the PUCCH format 2/2a/2b. And, Reed Muller (RM) channel coding may be applicable.

For instance, channel coding for UL (uplink) CQI in LTE system may be described as follows. First of all, bitstreams $a_0, a_1, a_3, \ldots, a_{A-1}$ may be coded using (20, A) RM code. In this case, $a_o$ and $a_{A-1}$ indicates MSB (Most Significant Bit) and LSB (Least Significant Bit), respectively. In case of an extended cyclic prefix, maximum information bits include 11 bits except a case that QI and ACK/NACK are simultaneously transmitted. After coding has been performed with 20 bits using the RM code, QPSK modulation may be applied. Before the BPSK modulation, coded bits may be scrambled.

Table 7 shows a basic sequence for (20, A) code.

TABLE 7

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_3, \ldots, b_{B-1}$ may be generated by Formula 1.

$$b_i = \sum_{n=0}^{A-1} (a_n \cdot M_{i,n}) \bmod 2 \quad \text{[Formula 1]}$$

In Formula 2, 'i=0, 1, 2, . . . , B−1' is met.

In case of wideband repots, a bandwidth of UCI (uplink control information) field for CQI/PMI can be represented as Tables 8 to 10 in the following.

Table 8 shows UCI (Uplink Control Information) field for broadband report (single antenna port, transmit diversity) or open loop spatial multiplexing PDSCH CQI feedback.

TABLE 8

| Field | Bandwidth |
|---|---|
| Broadband CQI | 4 |

Table 9 shows UL control information (UCI) field for CQI and PMI feedback in case of wideband reports (closed loop spatial multiplexing PDSCH transmission).

TABLE 9

| | Bandwidth | | | |
|---|---|---|---|---|
| | 2 antenna ports | | 4 antenna ports | |
| Field | rank = 1 | rank = 2 | rank = 1 | Rank > 1 |
| Wideband CQI | 4 | 4 | 4 | 4 |
| Spatial differential CQI | 0 | 3 | 0 | 3 |
| Precoding Matrix Indication | 2 | 1 | 4 | 4 |

Table 10 shows UL control information (UCI) field for RI feedback in case of wideband reports.

TABLE 10

| | Bit widths | | |
|---|---|---|---|
| | | 4 antenna ports | |
| Field | 2 antenna ports | Max. 2 layers | Max. 4 layers |
| Rank Indication | 1 | 1 | 2 |

FIG. 20 is a diagram for PRB allocation. Referring to FIG. 20, PRB may be usable for PUCCH transmission in a slot $n_s$.

2. The General of 3GPP LTE/LTE-A System for the Invention 2.1. The General of Carrier Aggregation Communication environments taken into consideration by embodiments of the present invention include a multicarrier supportive environment. In particular, a multicarrier or CA (carrier aggregation) system used by the present invention means a system that uses at least one component carrier (CC) having a bandwidth smaller than a target band by aggregation in configuring a target broadband to support a broadband.

According to the present invention, multicarrier means aggregation of carriers (or carrier aggregation). In this case, the carrier aggregation means aggregation of non-contiguous carriers as well as aggregation of contiguous carriers. Moreover, the number of component carriers aggregated in DL may be set to different from that of component carriers aggregated in UL. If the downlink component carrier (hereinafter abbreviated DL CC) number (and/or bandwidth) and the uplink component carrier (hereinafter abbreviated UL CC) number (and or bandwidth) are equal to each other, it is called a symmetric aggregation. Otherwise, it is called an asymmetric aggregation. The above-mentioned carrier aggregation may be interchangeably substituted with such a terminology as a bandwidth aggregation, a spectrum aggregation and the like.

In the carrier aggregation configured in a manner of combining at least two or more component carriers together, the goal of the LTE-A system is to support bandwidths up to 100 MHz. When at least one carrier having a bandwidth smaller than a target band is combined or aggregated, the bandwidth of the aggregated carrier may be limited to a bandwidth used by a legacy IMT system to secure backward compatibility with the legacy system. For instance, a legacy 3GPP LTE system supports bandwidths of {1.4, 3, 5, 10, 15, 20} MHz and a 3GPP LTE-advanced (LTE-A) system may be configured to support a bandwidth greater than 20 MHz for compatibility with the legacy system using the above bandwidths only. Moreover, a carrier aggregation system of the present invention may be configured to support carrier aggregation by defining a new bandwidth irrespective of bandwidths used by a legacy system.

LTE-A system uses the concept of a cell to manage radio resources. The above-mentioned carrier aggregation environment may be called a multi-cell environment (environment of multiple cells). A cell is defined as a combination of a pair of a DL resource (DL CC) and a UL resource (UL CC). Yet, the UL resource is not a necessary element. Hence, the cell may be configured with a DL resource only or both a DL resource and a UL resource. In case that a specific user equipment has one configured serving cell only, it may have one DL CC and one UL CC. Yet, in case that a specific user equipment has at least two configured serving cells, the number of DL CCs is equal to the number of the cells but the number of UL CCs may be equal to or smaller than the number of the cells. Alternatively, DL CCs and UL CCs may be configured to the contrary. In particular, in case that a specific user equipment has a plurality of configured serving cells, it may be able to support a carrier aggregation environment in which the number of UL CCs is greater than that of DL CCs. In more particular, carrier aggregation may be understood as aggregation of at least two cells differing from each other in carrier frequency (e.g., center frequency of cell). In case that carrier aggregation is supported, a linkage between a carrier frequency of a DL resource (or DL CC) and a carrier frequency of a UL resource (or UL CC) may be indicated by system information. Simply, a downlink component carrier (DL CC) and an uplink component carrier (UL CC) may be named a downlink cell (DL Cell) and an uplink cell (UL Cell), respectively. In this case, the above-mentioned 'cell' should be discriminated from a generally used cell that is an area covered by a base station.

Cells used by LTE-A system may include a primary cell (PCell) and a secondary cell (SCell). PCell and SCell may be used as a serving cell. If a carrier aggregation is not configured for a user equipment in RRC_CONNECTED state or a user equipment does not support a carrier aggregation, there exists one serving cell configured with PCell only. On the other hand, if a carrier aggregation is configured for a user equipment in RRC_CONNECTED state, at least one serving cell may be able to exist. And, PCell and at least one SCell are included in a whole serving cells.

Serving cell (PCell and SCell) may be configured via RRC parameters. In particular, PhysCellId is a physical layer identifier and has an integer value ranging 0 to 503. SCellIndex is a short identifier used to identify SCell and has an integer value ranging 1 to 7. ServeCellIndex is a short identifier used to identify a serving cell (e.g., PCell, SCell) and has a value ranging 0 to 7. A value of 0 is applied to PCell and ScellIndex is previously given to be applied to SCell. In particular, a cell having a smallest cell ID (or a smallest cell index) in ServCellIndex becomes PCell.

The PCell means the cell operating on a primary frequency (or, a primary CC). The PCell is usable for a user equipment to perform an initial connection establishment process or a connection reconfiguration process. The PCell may include a cell indicated in a handover procedure. The PCell may mean the cell becomes a center of a control related communication in the serving cell configured in a carrier aggregation environment. In particular, a user equipment is able to perform a transmission by receiving assignment of PUCCH in its PCell only and is able to use the PCell only in obtaining system information or changing a monitoring procedure. E-UTRAN (evolved universal terrestrial radio access) may change PCell only for a handover procedure in a manner of sending a user equipment supportive of carrier aggregation environment an RRC connection reconfiguration (RRCConnectionReconfiguration) message of an upper layer, which contains mobility control information (mobilityControlInfo).

The SCell may mean the cell operating on a secondary frequency (or, a secondary CC). One PCell is assigned to a specific user equipment, while at least one SCell may be assigned to the specific user equipment. The SCell is configurable only after an RRC connection has been established. And, the SCell may be usable to provide an addition radio resource. PUCCH does not exist in the rest of cells (i.e., SCell) except PCell in the serving cell configured in the carrier aggregation environment. When E-UTRAN adds SCell to a user equipment supportive of a carrier aggregation environment, it may be able to provide all system information related to an operation of a related cell in RRC_CONNECTED state via a dedicated signal. A change of system information may be controlled by a release and addition of a related SCell. In doing so, it may be able to use an RRC connection reconfiguration (RRCConnectionReconfiguration) message of an upper layer. E-UTRAN may perform a dedicated signaling having a parameter differing per user equipment rather than a broadcasting in a related SCell.

After an initial security activating process has started, E-UTRAMN may be able to configure a network including at least one SCell in addition to PCell configured in the early stage of a connection establishment process. In a carrier aggregation environment, PCell or SCell may be able to work as a component carrier. In the following description of embodiments, a primary component carrier (PCC) may be usable as having the same meaning of PCell and a secondary component carrier (SCC) may be usable as having the same meaning of SCell.

A method of signaling DL control information and UL control information in a $1^{st}$ layer (i.e., physical layer) to support the wideband is described as follows.

First of all, a method of transmitting such DL control information as a size of a control region, UL and DL resource allocations and DL HARQ ACK/NACK indication on PDCCH is described as follows.

An independent control region size in DL may be applicable to each component carrier. In doing so, schemes (e.g., modulation, coding, mapping to resource elements, etc.) of the existing 3GPP LTE Release-8 system for PCFICH can be identically usable for a carrier having a control region. For signaling for resource allocation for DL (PDSCH) and UL (PUSCH) transmissions, PDCCH can allocates PDSCH resource to the same component carrier having the PDCCH assigned thereto and can also allocate PUSCH resource to a single linked uplink component carrier. In doing so, the PDCCH structure (e.g., same coding, resource mapping based on the same CCE, etc.) and DCI format of the existing 3GPP LTE Release-8 system can be identically usable for each component carrier. And, the PDCCH can assign PDSCH or PUSCH to one of multiple component carriers using a carrier indicator field (CIF). In doing so, the DCI format of the existing 3GPP LTE Release-8 system can be extended to include a carrier indicator field having 1 to 3 bits. And, the PDCCH structure (e.g., same coding, resource mapping based on the same CCE, etc.) of the existing 3GPP LTE Release-8 system can be identically used. The carrier indicator field can be semi-statically configured. For a downlink control signaling for a downlink HARQ ACK/NACK indication, a PHICH physical transmission scheme (e.g., orthogonal code configuration, scramble sequence, mapping to resource element, etc.) of the existing 3GPP LTE Release-8 system is identically usable. In doing so, PHICH is transmitted on a downlink component carrier used for a UL grant transmission. If the number of downlink component carriers is equal to or greater than that of uplink component carriers, the carrier indicator field may not be used. In doing so, the PHICH resource mapping rule of the existing 3GPP LTE Release-8 system can be identically used.

A method of transmitting such an uplink control information as HARQ ACK/NACK, scheduling request (SR), channel state information (CSI) and the like on PUCCH is described as follows.

First of all, for the uplink control information signaling for HARQ ACK/NACK, every HARQ ACK/NACK can be transmitted on PUCCH when PUSCH is not transmitted. Generally, one ACK/NACK transmission can be supported for each downlink component carrier transport block. Yet, in order to prevent power consumption, the ACK/NACK transmission may be restricted on the downlink component carrier transport block. In doing so, ACK/NACK resource can be allocated in further consideration of aspects of user equipment performance and power control rather than optimizing resources for many user equipments on which multiple downlink component carriers are simultaneously scheduled. A scheduling request is transmitted on PUCCH and a specific uplink component carrier can be semi-statically mapped to one user equipment. And, a periodic CSI report via PUCCH can be supported with maximum 5 downlink component carriers. Regarding CSI, a specific uplink component carrier can be semi-statically mapped to one user equipment and may follow the rules of the existing 3GPP LTE Release-8 system for CQI, PMI and RI in order to extend CSI payload or reduce report overhead.

Figure 21:
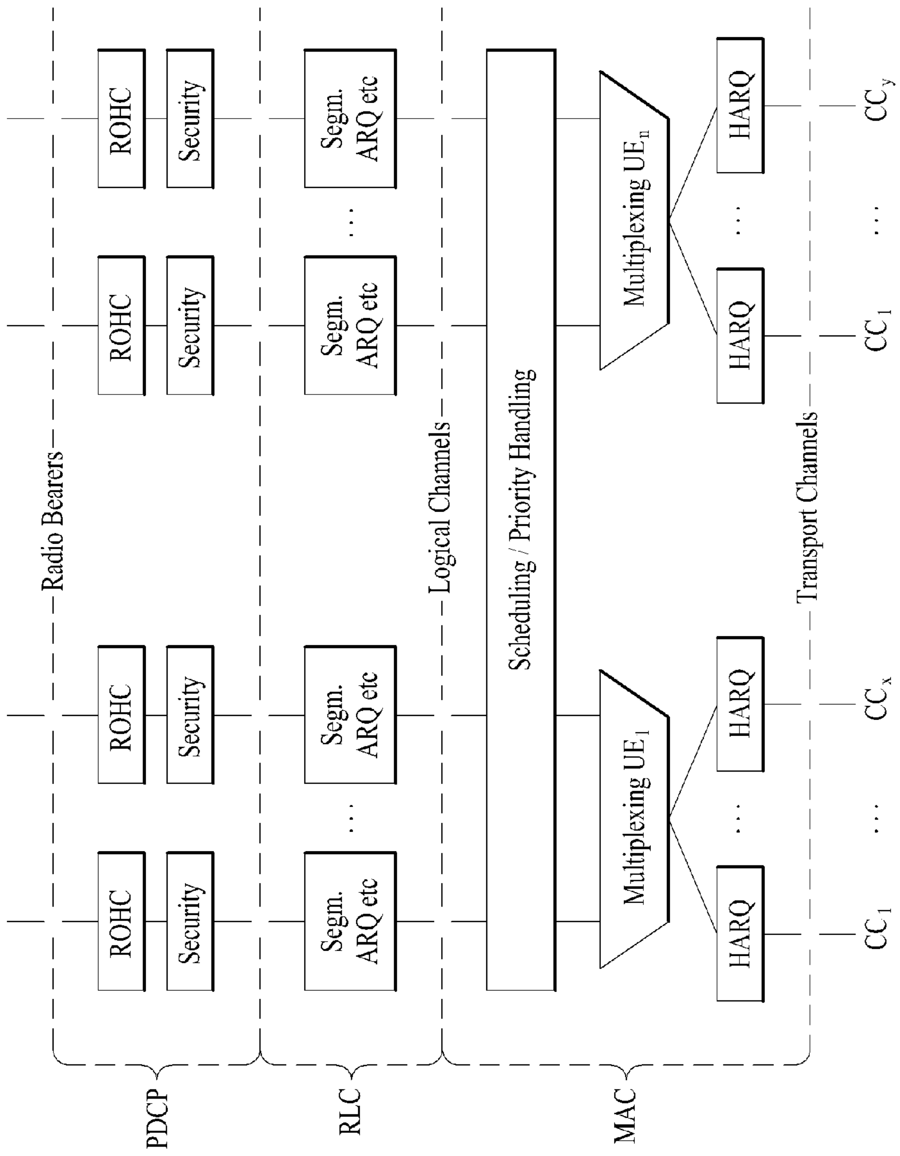
FIG. 21 is a diagram for one example of Layer 2 structure for a downlink in a multicarrier supportive system.
Figure 22:
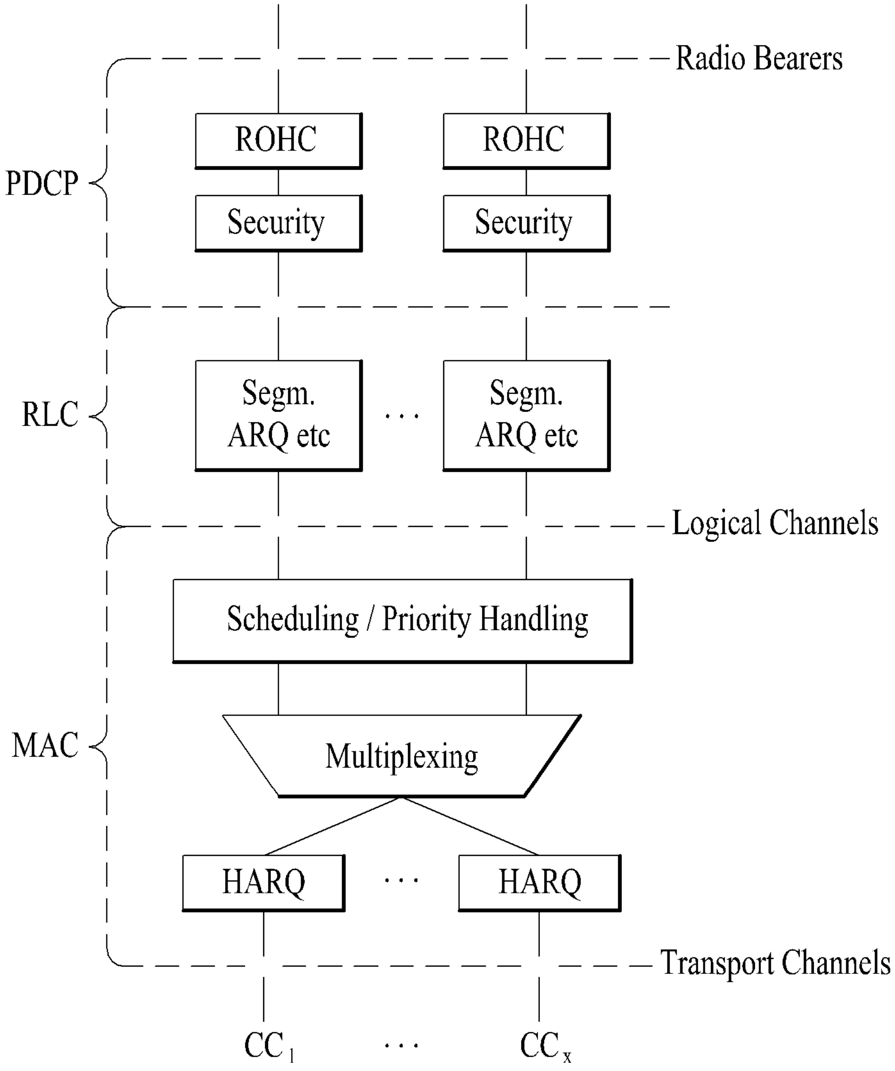
FIG. 22 is a diagram for one example of Layer 2 structure for an uplink in a multicarrier supportive system.

FIG. 21 is a diagram for one example of Layer 2 structure for a downlink in a multicarrier supportive system. And, FIG. 22 is a diagram for one example of Layer 2 structure for an uplink in a multicarrier supportive system.

1) User Plane

Compared to the structure of Layer 2 of the existing 3GPP LTE Release-8 system, one HARQ entity is required for one component carrier in a multicarrier environment.

Looking into MAC (media access control) layer, Layer 2 aspect can maintain the existing 3GPP LTE Release-8 system in aspect of a user equipment. One transport block (if spatial multiplexing is not supported) (e.g., maximum 2 transport blocks in case of spatial multiplexing) and one independent HARQ entity exist per scheduled component carrier. Each transport block is mapped to a single component carrier and all HARQ retransmissions are performed through the corresponding component carrier. A user equipment may have multiple component carriers scheduled simultaneously but a random access procedure can proceed once at most. In case that a single component carrier is configured in a user equipment, DRX (discontinuous reception) may become a baseline. Otherwise, the same DRX operation (i.e., applying an active time for PDCCH monitoring to all configured component carriers) may become a baseline. In the active time, any component carrier can schedule PDSCH on another configured component carrier.

RLC protocol of the existing 3GPP LTE Release-8 system can identically apply to RLC (radio link control) and PDCP (packet data convergence protocol) layers.

2) Control Plane

The structure of the control plane of the existing 3GPP LTE Release-8 system is identically applicable.

A cell is identified by a unique ECGI (E-UTRAN cell global identifier) and follows a transmission of system information included in a single component carrier. The system information of the existing 3GPP LTE Release-8 system and the extension information for LTE-A can be transmitted on a component carrier backward compatible with the existing system. Each component carrier can provide system information through BCCH (broadcast control channel).

Like the existing 3GPP LTE Release-8 system, a user equipment has a single RRC (radio resource control) connection to a network. A cell (hereinafter named 'special cell') in connected mode with a user equipment can provide a security input (e.g., a single ECGI, a single PCI (physical cell identity), a single ARFCN (absolute radio frequency channel number), etc.) and an NAS (non-access stratum) mobility information (e.g., TAI (tracking area identity)).

After the RRC connection to the special cell has been established, reconfiguration, adding and release of a component carrier can be performed through a radio access reconfiguration message 'RCConnectionReconfiguration' including mobility control information 'mobilityControlInfo' In particular, it corresponds to a case of an intra-cell handover. Moreover, the radio access reconfiguration message failing in including the mobility control information may be usable for the adding of a component carrier and may be also usable for the release of component carriers except the component carrier corresponding to the special cell.

In the intra-cell handover, the radio access reconfiguration message including the mobility control information can release, reconfigure or add a component carrier used for a target cell. When a new component carrier is added, it is able to use a dedicated RRC signaling to deliver information on a component carrier required for a component carrier transmission/reception.

Even if a user equipment detects a failure of one component carrier, it may not trigger for re-establishment of RRC connection. In case that all component carriers having received PDCCH fail, that all uplink communications are lost, or that an RRC layer indicates that a maximum count of retransmission is reached, the user equipment can re=establish the RRC connection.

A user equipment monitors a component carrier on a carrier frequency different from that of a measurement object which needs to have a component carrier configured for a measurement by the user equipment. Inter-frequency neighbor measurements include frequencies of all carriers failing to be configured as component carriers.

A mobile procedure in idle mode of the existing 3GPP LTE Release-8 system can be identically applicable to a network that sets a subset of component carriers for the idle mode.

For clarity of the following description, upper layers such the PDCP (packet data convergence protocol) shown in FIG. 21 and the RLC (radio link control) shown in FIG. 22 are schematically explained as follows.

Figure 23:
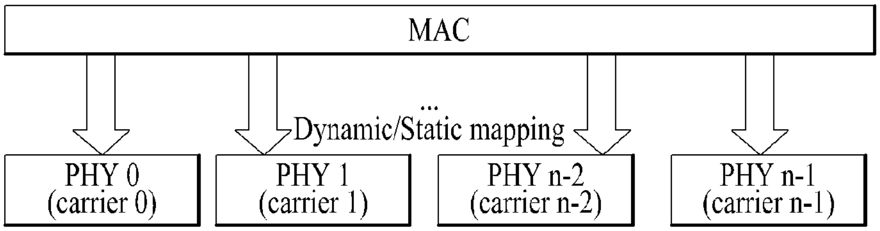
FIG. 23 is a diagram of concept for one MAC to manage multi-carrier in a base station.

FIG. 23 is a diagram of concept for one MAC to manage multicarrier in a base station. And, FIG. 24 is a diagram of concept for one MAC to manage multicarrier in a user equipment.

Figure 24:
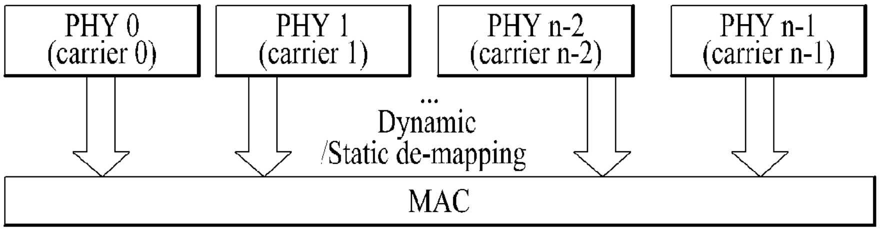
FIG. 24 is a diagram of concept for one MAC to manage multi-carrier in a user equipment.

Referring to FIG. 23 and FIG. 24, one MAC may perform transmission and reception by managing and operating at least one or more frequency carriers. Since the frequency carriers managed by one MAC may not need to be contiguous with each other, it may be advantageous that they are more flexible in aspect of resource management. In FIG. 23 and FIG. 24, one PHY may mean one component carrier for clarity and convenience. In this case, it is not necessary for one PHY to mean an independent RF (radio frequency) device. One independent RF device generally means one PHY, which is not mandatory. And, one RF device may include a plurality of PHYs.

Figure 25:
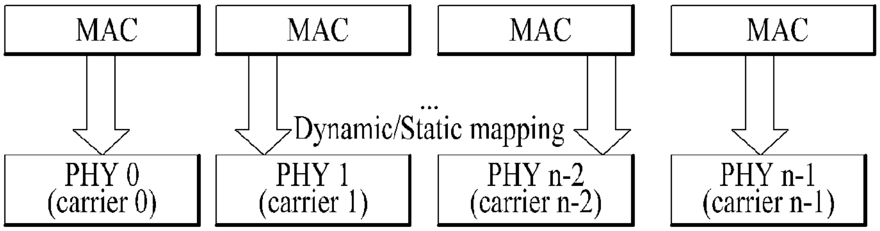
FIG. 25 is a diagram of concept for a plurality of MACs to manage multi-carrier in a base station.
Figure 26:
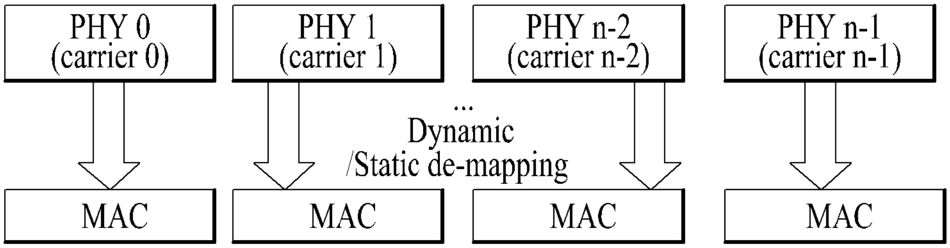
FIG. 26 is a diagram of concept for a plurality of MACs to manage multi-carrier in a user equipment.
Figure 27:
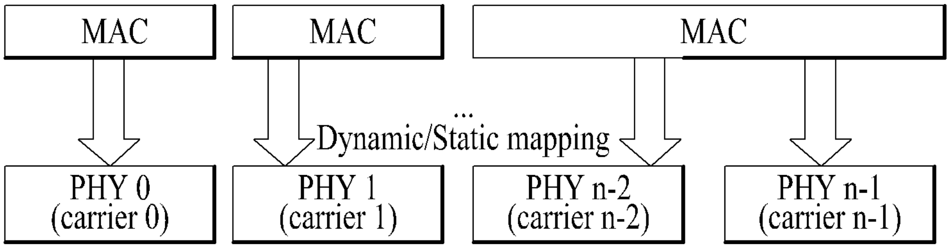
FIG. 27 is a diagram of another concept for a plurality of MACs to manage multi-carrier in a base station.
Figure 28:
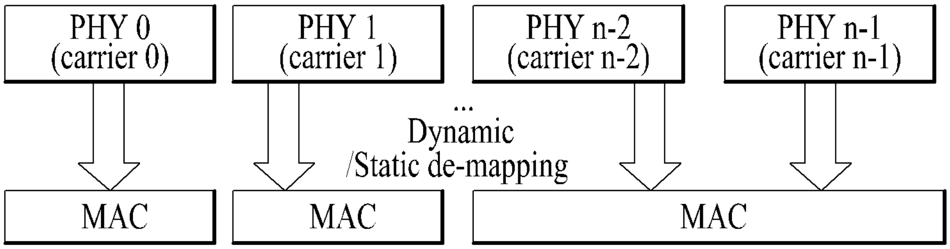
FIG. 28 is a diagram of another concept for a plurality of MACs to manage multi-carrier in a user equipment.

FIG. 25 is a diagram of concept for a plurality of MACs to manage multicarrier in a base station. FIG. 26 is a diagram of concept for a plurality of MACs to manage multicarrier in a user equipment. FIG. 27 is a diagram of another concept for a plurality of MACs to manage multicarrier in a base station. And, FIG. 28 is a diagram of another concept for a plurality of MACs to manage multicarrier in a user equipment.

Like FIGS. 25 to 28, a plurality of carriers may be controlled by a plurality of MACs instead of one MAC.

Like FIG. 25 and FIG. 26, each MAC can control each carrier by 1:1. Like FIG. 27 and FIG. 28, each MAC controls each carrier by 1:1 for some carriers and one MAC may control the rest of at least one or more carriers.

The above-mentioned system may be the system including a plurality of carriers (e.g., 1 to N carriers). And, each of the carriers may be usable contiguously or non-contiguously. This may be applicable irrespective of uplink/downlink. TDD system may be configured to operate a plurality of carriers (e.g., N carriers) in each of which DL/UL transmission is included. In case of the FDD system, asymmetric carrier aggregation, in which the numbers of carriers aggregated in DL and UL or bandwidths of the aggregated carriers are different from each other, may be supportable.

2.2. CA PUCCH (Carrier Aggregation Physical Uplink Control Channel)

In a wireless communication system supportive of carrier aggregation, PUCCH format for feeding back UCI (e.g., multi-ACK/NACK bit) can be defined. For clarity of the following description, such PUCCH format shall be named CA PUCCH format.

Figure 29:
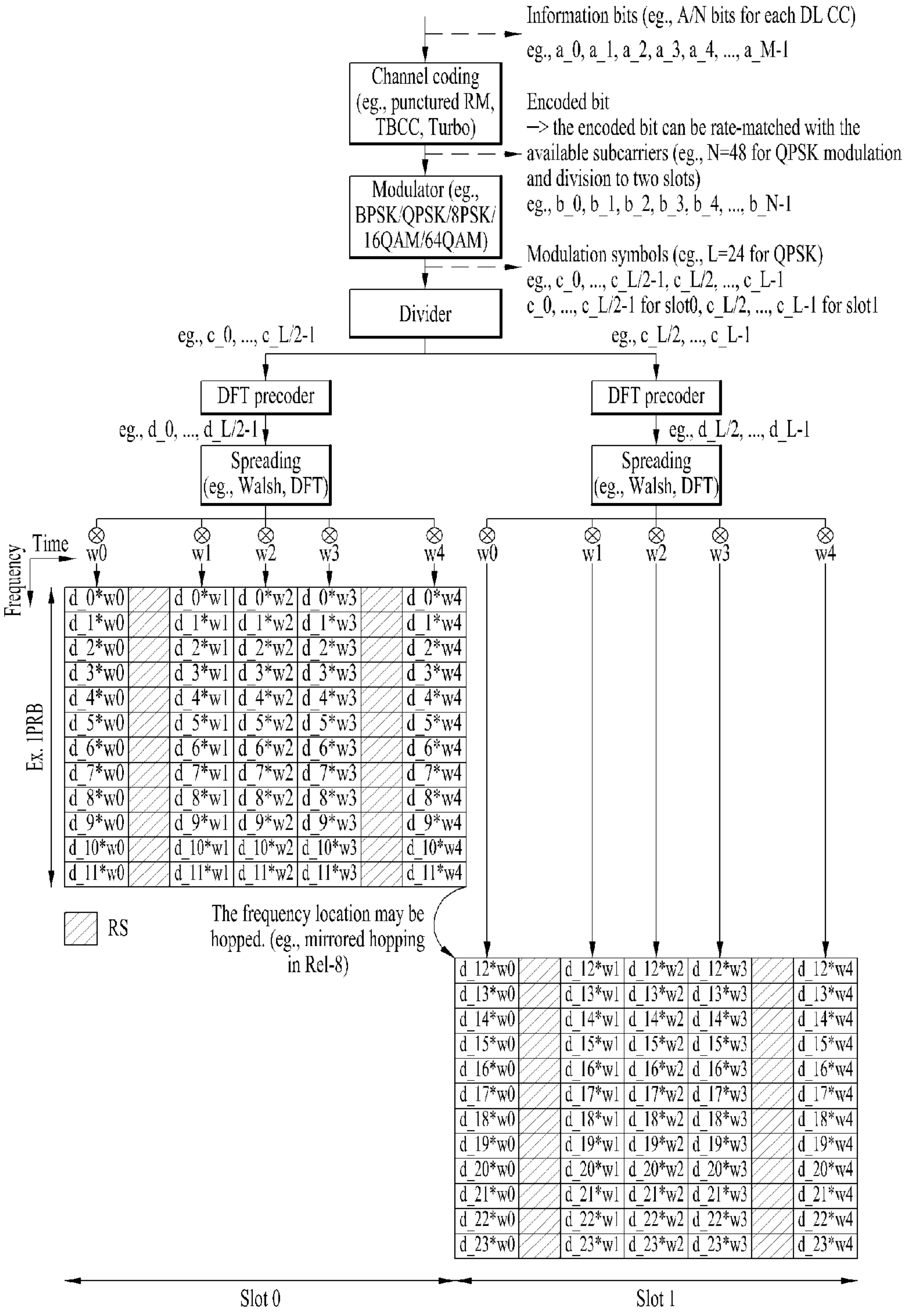
FIG. 29 is a diagram for one example of a signal processing process of CA PUCCH.

FIG. 29 is a diagram for one example of a signal processing process of CA PUCCH.

Referring to FIG. 29, a channel coding block generates coding bits (e.g., encoded bits, coded bits, etc.) (or codeword) $b_0$, $b_1$, . . . and $b\_N-1$ by channel-coding information bits $a_0$, $a_1$, . . . and $a\_M-1$ (e.g., multiple ACK/NACK bits). In this case, the M indicates a size of information bits and the N indicates a size of the coding bits. The information bits may include multiple ACK/NACK for UL control information (UCI), e.g., a plurality of data (or PDSCH) received via a plurality of DL CCS. In this case, the information bits a_0, a_1, . . . a_M−1 may be joint-coded irrespective of type/number/size of the UCI configuring the information bits. For instance, in case that information bits include multiple ACK/NACK for a plurality of DL CCs, channel coding may not be performed per DL CC or individual ACK/NACK bit but may be performed on all bit information, from which a single codeword may be generated. And, channel coding is non-limited by this. Moreover, the channel coding may include one of simplex repetition, simplex coding, RM (Reed Muller) coding, punctured RM coding, TBCC (tail-biting convolutional coding), LDPC (low-density parity-check), turbo coding and the like. Besides, coding bits may be rate-matched in consideration of a modulation order and a resource size (not shown in the drawing). A rate matching function may be included as a part of the channel coding block or may be performed via a separate function block.

A modulator generates modulated symbols c_0, c_1 . . . c_L−1 by modulating coding bits b_0, b_1 . . . b_N−1. In this case, the L indicates a size of modulated symbol. This modulation scheme may be performed in a manner of modifying a size and phase of a transmission signal. For instance, the modulation scheme may include one of n-PSK (Phase Shift Keying), n-QAM (Quadrature Amplitude Modulation) and the like, where n is an integer equal to or greater than 2. In particular, the modulation scheme may include one of BPSK (Binary PSK), QPSK (Quadrature PSK), 8-PSK, QAM, 16-QAM, 64-QAM and the like.

A divider divides the modulated symbols c_0, c_1 . . . c_L−1 to slots, respectively. A sequence/pattern/scheme for dividing the modulated symbols to the slots may be specially non-limited. For instance, the divider may be able to divide the modulated symbols to the corresponding slots in order from a head to tail (Localized scheme). In doing so, as shown in the drawing, the modulated symbols c_0, c_1 . . . c_L/2−1 may be divided to the slot 0 and the modulated symbols c_L/2, c_L/2+1 . . . c_L−1 may be divided to the slot 1. Moreover, the modulated symbols may be divided to the corresponding slots, respectively, by interleaving or permutation. For instance, the even-numbered modulated symbol may be divided to the slot 0, while the odd-numbered modulated symbol may be divided to the slot 1. The modulation scheme and the dividing scheme may be switched to each other in order.

A DFT precoder may perform DFT precoding (e.g., 12-point DFT) on the modulated symbols divided to the corresponding slots to generate a single carrier waveform. Referring to the drawing, the modulated symbols c_0, c_1 . . . c_L/2−1 divided to the corresponding slot 0 may be DFT-precoded into DFT symbols d_0, d_1 . . . d_L/2−1, and the modulated symbols c_L/2, c_L/2+1 . . . c_L−1 divided to the slot 1 may be DFT-precoded into DFT symbols d_L/2, d_L/2+1 . . . d_L−1. Moreover, the DFT precoding may be replaced by another linear operation (e.g., Walsh precoding) corresponding thereto.

A spreading block may spread the DFT-performed signal at SC-FDMA symbols level (e.g., time domain). The time-domain spreading at the SC-FDMA level may be performed using a spreading code (sequence). The spreading code may include pseudo orthogonal code and orthogonal code. The pseudo orthogonal code may include PN (pseudo noise) code, by which the pseudo orthogonal code may be non-limited. The orthogonal code may include Walsh code and DFT code, by which the orthogonal code may be non-limited. The orthogonal code (OC) may be interchangeably used with one of an orthogonal sequence, an orthogonal cover (OC) and an orthogonal cover code (OCC). In this specification, for example, the orthogonal code may be mainly described as a representative example of the spreading code for clarity and convenience of the following description. Optionally, the orthogonal code may be substituted with the pseudo orthogonal code. A maximum value of a spreading code size (or a spreading factor: SF) may be limited by the number of SC-FDAM symbols used for control information transmission. For example, in case that 5 SC-FDMA symbols are used in one slot for control information transmission, orthogonal codes (or pseudo orthogonal codes) w0, w1, w2, w3 and w4 of length 5 may be used per slot. The SF may mean a spreading degree of the control information and may be associated with a multiplexing order or an antenna multiplexing order of a user equipment. The SF may be variable like 1, 2, 3, 4, 5 . . . depending on a requirement of a system. The SF may be defined in advance between a base station and a user equipment. And, the SF may be notified to a user equipment via DCI or RRC signaling.

The signal generated through the above-described process may be mapped to subcarrier within the PRB and may be then transformed into a time-domain signal through IFFT. CP may be attached to the time-domain signal. The generated SC-FDMA symbol may be then transmitted through an RF stage.

2.2.1. CSI (Channel State Information Feedback) on PUCCH

First of all, in the 3GPP LTE system, when a DL reception entity (e.g., a user equipment) is connected to a DL transmission entity (e.g., a base station), the DL reception entity performs measurement on a reference signal received power (RSRP) of a reference signal transmitted in DL, a quality of a reference signal (RSRQ: reference signal received quality) and the like at a random time and is then able to make a periodic or even-triggered report of a corresponding measurement result to the base station.

Each user equipment reports a DL channel information in accordance with a DL channel status via uplink. A base station is then able to determine time/frequency resources, MCS (modulation and coding scheme) and the like appropriate for a data transmission to each user equipment using the DL channel information received from the each user equipment.

Such channel state information (CSI) may include CQI (Channel Quality Indication), PMI (Precoding Matrix Indicator), PTI (Precoder Type Indication) and/or RI (Rank Indication). In particular, the CSI may be transmitted entirely or partially depending on a transmission mode of each user equipment. CQI is determined based on a received signal quality of a user equipment, which may be generally determined on the basis of a measurement of a DL reference signal. In doing so, a CQI value actually delivered to a base station may correspond to an MCS capable of providing maximum performance by maintaining a block error rate (BLER) under 10% in the received signal quality measured by a user equipment.

This channel information reporting may be classified into a periodic report transmitted periodically and an aperiodic report transmitted in response to a request made by a base station.

In case of the aperiodic report, it is set for each user equipment by a 1-bit request bit (CQI request bit) contained in UL scheduling information downloaded to a user equipment by a base station. Having received this information, each user equipment is then able to deliver channel information to the base station via a physical uplink shared channel (PUSCH) in consideration of its transmission mode. And, it may set RI and CQI/PMI not to be transmitted on the same PUSCH.

In case of the periodic report, a period for transmitting channel information via an upper layer signal, an offset in the corresponding period and the like are signaled to each user equipment by subframe unit and channel information in consideration of a transmission mode of each user equipment may be delivered to a base station via a physical uplink control channel (PUCCH) in accordance with a determined period. In case that data transmitted in uplink simultaneously exists in a subframe in which channel information is transmitted by a determined period, the corresponding channel information may be transmitted together with the data not on the physical uplink control channel (PUCCH) but on a physical uplink shared channel (PUSCH). In case of the periodic report via PUCCH, bits (e.g., 11 bits) limited further than those of the PUSCH may be used. RI and CQI/PMI may be transmitted on the same PUSCH.

In case that contention occurs between the periodic report and the aperiodic report in the same subframe, only the aperiodic report can be performed.

In calculating Wideband CQI/PMI, a most recently transmitted RI may be usable. RI in a PUCCH CSI report mode is independent from RI in a PUSCH CSI report mode. The RI in the PUSCH CSI report mode is valid for CQI/PMI in the corresponding PUSCH CSI report mode only.

Table 11 is provided to describe CSI feedback type transmitted on PUCCH and PUCCH CSI report mode.

4-bit WB PMI can be transmitted together with RI transmission. Additionally, if RI is greater than 1, 3-bit WB (wideband) spatial differential CQI can be transmitted. In 2-codeword transmission, the WB spatial differential CQI may indicate a difference value between a WB CQI index for codeword 1 and a WB CQI index for codeword 2. The difference value in-between may have a value selected from a set {−4, −3, −2, −1, 0, 1, 2, 3} and can be represented as 3 bits.

The mode 2-0 corresponds to a case that CQI on a UE-selected band is transmitted in the absence of PMI transmission. In this case, RI is transmitted only in case of open-loop spatial multiplexing (SM) and a WB CQI represented as 4 bits may be transmitted. A best CQI (best-1) is transmitted on each bandwidth part (BP) and the best-1 CQI may be represented as 4 bits. And, an L-bit indicator indicating the best-1 may be transmitted together. If the RI is greater than 1, a CQI for a 1st codeword can be transmitted.

And, the mode 2-1 corresponds to a case that a single PMI and a CQI on a UE-selected band are transmitted. In this case, together with RI transmission, 4-bit WB CQI, 3-bit WB spiral differential CQI and 4-bit WB PMI can be transmitted. Additionally, 4-bit best-1 CQI is transmitted on each bandwidth part (BP) and L-bit best-1 indicator can be transmitted together. Additionally, if RI is greater than 1, 3-bit best-1 spatial differential CQI can be transmitted. In 2-codeword transmission, it may indicate a difference value between a best-1 CQI index of codeword 1 and a best-1 CQI index of codeword 2.

TABLE 11

| | | PMI Feedback Type | |
|---|---|---|---|
| | | No PMI (OL, TD, single-antenna) | Single PMI (CL) |
| CQI Feedback Type | Wideband | Model 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
| | UE Selected | Mode 2-0<br>RI (only for Open-Loop SM)<br>Wideband CQI (4 bit)<br>Best-1 CQI (4 bit) in each BP<br>Best-1 indicator(L-bit label)<br>when RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

Referring to Table 11, in the periodic report of channel information, there are 4 kinds of reporting modes (mode 1-0, mode 1-2, mode 2-0 and mode 2-1) in accordance with CQI and PMI feedback types.

CQI can be classified into WB (wideband) CQI and SB (subband) CQI in accordance with CQI feedback type and PMI can be classified into No PMI or Single PMI in accordance with a presence or non-presence of PMI transmission. In Table 11, No PMI corresponds to a case of open-loop (OL), transmit diversity (TD) and single-antenna, while Single PMI corresponds to a case of closed-loop (CL).

The mode 1-0 corresponds to a case that WB CQI is transmitted in the absence of PMI transmission. In this case, RI is transmitted only in case of open-loop (OL) spatial multiplexing (SM) and one WB CQI represented as 4 bits can be transmitted. If RI is greater than 1, CQI for a 1st codeword can be transmitted.

The mode 1-1 corresponds to a case that a single PMI and WB CQI are transmitted. In this case, 4-bit WB CQI and For the transmission modes, periodic PUCCH CSI report modes are supported as follows.

1) Transmission mode 1: Modes 1-0 and 2-0
2) Transmission mode 2: Modes 1-0 and 2-0
3) Transmission mode 3: Modes 1-0 and 2-0
4) Transmission mode 4: Modes 1-1 and 2-1
5) Transmission mode 5: Modes 1-1 and 2-1
6) Transmission mode 6: Modes 1-1 and 2-1
7) Transmission mode 7: Modes 1-0 and 2-0
8) Transmission mode 8: Modes 1-1 and 2-1 if a user equipment is set to make a PMI/RI reporting, or Modes 1-0 and 2-0 if a user equipment is set not to make a PMI/RI reporting
9) Transmission mode 9: Modes 1-1 and 2-1 if a user equipment is set to make a PMI/RI reporting and the number of CSI-RS ports is greater than 1, or Modes 1-0 and 2-0 if a user equipment is set not to make a PMI/RI reporting and the number of CSI-RS port(s) is equal to 1.

The periodic PUCCH CSIU reporting mode in each serving cell is set by upper layer signaling. And, the mode 1-1 is set to either submode 1 or submode 2 by an upper layer signaling using a parameter 'PUCCH_format1-1_CSI_reporting_mode'.

A CQI reporting in a specific subframe of a specific serving cell in a UE-selected SB CQI means a measurement of at least one channel state of a bandwidth part (BP) corresponding to a portion of a bandwidth of a serving cell. An index is given to the bandwidth part in a frequency increasing order starting with a lowest frequency without an increment of a bandwidth.

$N_{RB}^{DL}$ Indicates the number of resource blocks (RBs) of a serving cell system bandwidth. The system bandwidth may be divided into N (1, 2, 3, . . . N) SB CQI subbands. One SB CQI may include k RBs defined in Table 15. If the number of RBs of the whole bandwidth is not a multiple integer of k ($\lceil N_{RB}^{DL}/k\rceil-\lfloor N_{RB}^{DL}/k\rfloor>0$), the number of RBs configuring a last (i.e., $N^{th}$) SB CQI may be determined by Formula 2.

$$N_{RB}^{DL}-k\cdot\lfloor N_{RB}^{DL}/k\rfloor \quad \text{[Formula 2]}$$

Table 12 shows relationship among subband size k, bandwidth part (BP) and system bandwidth $N_{RB}^{DL}$.

TABLE 12

| Syatem Bandwidth $N_{RB}^{DL}$ | Subband Size k (RBs) | Bandwidth Parts (J) |
|---|---|---|
| 6-7 | NA | NA |
| 8-10 | 4 | 1 |
| 11-26 | 4 | 2 |
| 27-83 | 6 | 3 |
| 64-110 | 8 | 4 |

Moreover, $N_J$ CQI subbands configure one bandwidth part (BP) and a system bandwidth can be divided into J BPs. If J=1, $N_J$ is equal to $\lceil N_{RB}^{DL}/k/J\rceil$. If J>1, $N_J$ is equal to or $\lceil N_{RB}^{DL}/k$. A user equipment calculates a CQI index for a preferred best one (best-1) CQI band in BP and may be then able to transmit the CQI index on PUCCH. In doing so, a best-1 indicator indicating what is the best-1 CQI subband selected from one BP may be transmitted together. The best-1 indicator may be configured with L bits, where the 'L' can be represented as Formula 3.

$$L=\lceil \log_2\lceil N_{RB}^{DL}/k/J\rceil\rceil \quad \text{[Formula 3]}$$

In the above UE-selected CQI reporting mode, it is able to determine a frequency band in which a CQI index is calculated.

In the following description, a CQI transmission period is explained.

Table 13 shows CQI and PMI payload sizes of each PUCCH CSI report mode.

TABLE 13

| | | | PUCCH Reporting Modes | | | |
|---|---|---|---|---|---|---|
| PUCCH Format | Reported | Mode State | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |
| 1a | Sub-band CQI/ second PMI | 8 antenna ports RI = 1 | NA | 8 + L | NA | NA |
| | | 8 antenna ports 1 < RI < 5 | NA | 9 + L | NA | NA |
| | | 8 antenna ports RI > 4 | NA | 7 + L | NA | NA |
| 2 | Wideband CQI/PMI | 2 antenna ports RI = 1 | 6 | 6 | NA | NA |
| | | 4 antenna ports RI = 1 | 8 | 8 | NA | NA |
| | | 2 antenna ports RI > 1 | 8 | 8 | NA | NA |
| | | 4 antenna ports RI > 1 | 11 | 11 | NA | NA |
| 2a | Wideband first PMI | 8 antenna ports RI < 3 | NA | 4 | NA | NA |
| | | 8 antenna ports 2 < RI < 8 | NA | 2 | NA | NA |
| | | 8 antenna ports RI = 8 | NA | 0 | NA | NA |
| 2b | Wideband CQI/ second PMI | 8 antenna ports RI = 1 | 8 | 8 | NA | NA |
| | | 8 antenna ports 1 < RI < 4 | 11 | 11 | NA | NA |
| | | 8 antenna ports RI = 4 | 10 | 10 | NA | NA |
| | | 8 antenna ports RI > 4 | 7 | 7 | NA | NA |
| 2c | Wideband CQI/ first PMI/ second PMI | 8 antenna ports RI = 1 | 8 | — | NA | NA |
| | | 8 antenna ports 1 < RI ≤ 4 | 11 | — | NA | NA |
| | | 8 antenna ports 4 < RI ≤ 7 | 9 | — | NA | NA |
| | | 8 antenna ports RI = 8 | 7 | — | NA | NA |
| 3 | RI | 2-layer spatial multiplexing | 1 | 1 | 1 | 1 |
| | | 4-layer spatial multiplexing | 2 | 2 | 2 | 2 |
| | | 8-layer spatial multiplexing | 3 | 3 | NA | NA |
| 4 | Wideband CQI | RI = 1 or RI > 1 | NA | NA | 4 | 4 |
| 5 | RI/first PMI | 8 antenna ports, 2-layer spatial multiplexing | 4 | NA | NA | NA |
| | | 8 antenna ports, 4 and 8-layer spatial multiplexing | 5 | | | |
| 6 | RI/PTI | 8 antenna ports, 2-layer spatial multiplexing | NA | 2 | NA | NA |
| | | 8 antenna ports, 4-layer spatial multiplexing | NA | 3 | NA | NA |
| | | 8 antenna ports, 8-layer spatial multiplexing | NA | 4 | NA | NA |

Referring to Table 13, each CQI/PMI and RI reporting type (PUCCH reporting type) supported for PUCCH CSI report mode can be described as follows.

Reporting Type 1 supports CQI feedback for a subband selected by a user equipment.

Reporting Type 1a supports subband CQI and $2^{nd}$ PMI feedback.

Reporting Type 2/2b/2c supports WB CQI and PMI feedback.

Reporting Type 2a supports WB PMI feedback.

Reporting Type 3 supports RI feedback.

Reporting Type 4 supports WB CQI.

Reporting Type 5 supports RI and WB PMI feedback.

Reporting Type 6 supports RI and PTI feedback.

A user equipment can receive information including a combination of a transmission period of channel information and an offset from an upper layer by RRC signaling. The user equipment can transmit the channel information to a base station based on the provided information on the channel information transmission period. In each serving cell, a period $N_{pd}$ in a subframe for a CQI/PMI reporting and an offset $N_{OFFSET,CQI}$ in the subframe are determined based on a parameter 'cqi-pmi-ConfigIndex' ($I_{CQI/PMI}$) set up by upper layer signaling [cf. Table 14 and Table 15]. An offset $N_{OFFSET,RI}$ related to a period $M_{RI}$ for an RI reporting is determined based on a parameter 'ri-ConfigIndex' ($I_{RI}$) [cf. Table 16]. The offset NOFFSET,RI for the RI reporting has a value of $\{0, -1 \ldots -(N_{pd}-1)\}$ In case that a user equipment is set to report abnormality of one CSI subframe set, the 'cqi-pmi-ConfigIndex' and the 'ri-ConfigIndex' correspond to the period and offset of CQI/PMI and RI for a subframe set 1, respectively. And, the 'cqi-pmi-ConfigIndex2' and the 'ri-ConfigIndex2' correspond to the period and offset of CQI/PMI and RI for a subframe set 2, respectively.

Table 14 shows the mapping relation between $N_{pd}$ and $N_{OFFSET,CQI}$ of a parameter ICQI/PMI in FDD.

TABLE 14

| $I_{CQI/PMI}$ | Value of $N_{pd}$ | Value of $N_{OFFSET,\ CQI}$ |
|---|---|---|
| $0 \le I_{CQI/PMI} \le 1$ | 2 | $I_{CQI/PMI}$ |
| $2 \le I_{CQI/PMI} \le 6$ | 5 | $I_{CQI/PMI} - 2$ |
| $7 \le I_{CQI/PMI} \le 16$ | 10 | $I_{CQI/PMI} - 7$ |
| $17 \le I_{CQI/PMI} \le 36$ | 20 | $I_{CQI/PMI} - 17$ |
| $37 \le I_{CQI/PMI} \le 76$ | 40 | $I_{CQI/PMI} - 37$ |
| $77 \le I_{CQI/PMI} \le 156$ | 80 | $I_{CQI/PMI} - 77$ |
| $157 \le I_{CQI/PMI} \le 316$ | 160 | $I_{CQI/PMI} - 157$ |
| $I_{CQI/PMI} = 317$ | Reserved | |
| $318 \le I_{CQI/PMI} \le 349$ | 32 | $I_{CQI/PMI} - 318$ |
| $350 \le I_{CQI/PMI} \le 413$ | 64 | $I_{CQI/PMI} - 350$ |
| $414 \le I_{CQI/PMI} \le 541$ | 128 | $I_{CQI/PMI} - 414$ |
| $542 \le I_{CQI/PMI} \le 1023$ | Reserved | |

Table 15 shows the mapping relation between $N_{pd}$ and $N_{OFFSET,CQI}$ of a parameter ICQI/PMI in FDD.

TABLE 15

| $I_{CQI/PMI}$ | Value of $N_{pd}$ | Value of $N_{OFFSET,\ CQI}$ |
|---|---|---|
| $I_{CQI/PMI} = 0$ | 1 | $I_{CQI/PMI}$ |
| $1 \le I_{CQI/PMI} \le 5$ | 5 | $I_{CQI/PMI} - 1$ |
| $6 \le I_{CQI/PMI} \le 15$ | 10 | $I_{CQI/PMI} - 6$ |
| $16 \le I_{CQI/PMI} \le 35$ | 20 | $I_{CQI/PMI} - 16$ |
| $36 \le I_{CQI/PMI} \le 75$ | 40 | $I_{CQI/PMI} - 36$ |
| $76 \le I_{CQI/PMI} \le 155$ | 80 | $I_{CQI/PMI} - 76$ |
| $156 \le I_{CQI/PMI} \le 315$ | 160 | $I_{CQI/PMI} - 156$ |
| $316 \le I_{CQI/PMI} \le 1023$ | Reserved | |

Table 16 shows the mapping relation between $M_{RI}$ and $N_{OFFSET,RI}$ of a parameter $I_{RI}$ in TDD.

TABLE 16

| $I_{RI}$ | Value of $M_{RI}$ | Value of $N_{OFFSET,\ RI}$ |
|---|---|---|
| $0 \le I_{RI} \le 160$ | 1 | $-I_{RI}$ |
| $161 \le I_{RI} \le 321$ | 2 | $-(I_{RI} - 161)$ |
| $322 \le I_{RI} \le 482$ | 4 | $-(I_{RI} - 322)$ |
| $483 \le I_{RI} \le 643$ | 8 | $-(I_{RI} - 483)$ |
| $644 \le I_{RI} \le 804$ | 16 | $-(I_{RI} - 644)$ |
| $805 \le I_{RI} \le 965$ | 32 | $-(I_{RI} - 805)$ |
| $966 \le I_{RI} \le 1023$ | Reserved | |

WB CQI/PMI Reporting

A subframe for WB CQI/PMI reporting meets Formula 4 in the following.

$$(10\times n_f \lfloor_s/2\rfloor - N_{OFFSET,CQI}) \bmod (N_{pd}) = 0 \quad \text{[Formula 4]}$$

In an RI reporting is set up, a reporting interval of the RI reporting is equal to an integer multiple $M_{RI}$ of a period $N_{pd}$ in a subframe. The subframe for the RI reporting meets Formula 5 in the following.

$$(10\times n_f + \lfloor n_s/2\rfloor - N_{OFFSET,CQI} - N_{OFFSET,RI}) \bmod (N_{pd} \cdot M_{RI}) = 0 \quad \text{[Formula 5]}$$

WB CQI/PMI Reporting And SB CQI Reporting

If Both a WB CQI/PMI Reporting and an SB CQI Reporting are Set Up, a Subframe for the WB CQI/PMI reporting and the SB CQI reporting meets Formula 6 in the following.

$$(10\times n_f + \lfloor n_s/2\rfloor - N_{OFFSET,CQI}) \bmod N_{pd} = 0 \quad \text{[Formula 6]}$$

If a PTI is not transmitted or a most recently transmitted PTI is equal to 1, a WB CQI/WB PMI (or WB CQI/WB $2^{nd}$ PMI in transmission mode 9) reporting has a period of $H \cdot N_{pd}$ and a subframe meets Formula 7 in the following.

$$(10\times n_f + \lfloor n_s/2\rfloor - N_{OFFSET,CQI}) \bmod (H \cdot N_{pd}) = 0 \quad \text{[Formula 7]}$$

In Formula 7, H meets 'H=J·K+1' and J indicates the number of BP(s).

Between two consecutive WB CQI/WB PMI (or WB CQI/WB $2^{nd}$ PMI in transmission mode 9) reporting, a J·K reporting uses a sequence for an SB CQI reporting having full cycles K of BP except a case that an interval between the two consecutive WB CQI/WB PMI is smaller than the J·K reporting due to 0 of a system frame number transmission. In this case, a user equipment may not report SB CQI that is not transmitted before the $2^{nd}$ of the two WB CQI/WB PMI (or WB CQI/WB $2^{nd}$ PMI in transmission mode 9). The full cycles of each BP has an order increasing from $0^{th}$ BP to $(J-1)^{th}$ BP and the parameter K may be set by upper layer signaling.

On the other hand, if the most recently transmitted PTI is equal to 0, a $1^{st}$ WB PMI has a period $H' \cdot N_{pd}$ and a subframe meets Formula 8 in the following.

$$(10\times n_f + \lfloor n_s/2\rfloor - N_{OFFSET,CQI}) \bmod (H' \cdot N_{pd}) = 0 \quad \text{[Formula 8]}$$

In Formula 8, H' is signaled by an upper layer.

A reporting remaining between two consecutive $1^{st}$ WB PMI reporting can use a $2^{nd}$ WB PMI in WB CQI.

If an RI reporting is set up, a reporting interval of RI is MRI times greater than the WB CQI/PMI period $H \cdot N_{pd}$. The RI is reported through the same PUCCH cyclic shift resource of the WB CQI/PMI and SB CQI reporting and a subframe for the RI reporting meets Formula 9 in the following.

$$(10\times n_f+\lfloor n_s/2\rfloor-N_{OFFSET,CQI}-N_{OFFSET,RI})\bmod(H\cdot N_{pd}\cdot M_{RI})=0 \quad \text{[Formula 9]}$$

Meanwhile, in case that contention occurs between a CSI report having PUCCH reporting type 3, 5 or 6 for one serving cell and a CSI report having PUCCH reporting type 1, 1a, 2, 2a, 2b, 2c or 4 for the same serving cell, the CSI report having a PUCCH reporting type (e.g., 1, 1a, 2, 2a, 2b, 2c and 4) of a low priority is dropped.

In case that at least one serving cell is configured for a user equipment, the user equipment transmits a CSI report for only one serving cell in a determined subframe. In the determined subframe, if contention occurs between a CSI report having PUCCH reporting type 3, 5, 6 or 2a for one serving cell and a CSI report having PUCCH reporting type 1, 1a, 2, 2b, 2c or 4 of another serving cell, the CSI report having the PUCCH reporting type (e.g., 1, 1a, 2, 2b, 2c and 4) of a low priority is dropped. Moreover, in the determined subframe, if contention occurs between a CSI report having PUCCH reporting type 2, 2b, 2c or 4 for one serving cell and a CSI report having PUCCH reporting type 1 or 1a of another serving cell, the CSI report having the PUCCH reporting type (e.g., 1 and 1a) of a low priority is dropped.

In the determined subframe, if contention occurs between CSI reports for different serving cells having a PUCCH reporting type of the same priority, a CSI for the serving cell having the lowest 'ServCellIndex' is reported and the CSI report for the rest of serving cells is dropped.

A CSI report of a determined PUCCH reporting type can be transmitted through PUCCH resource $n_{PUCCH}^{(2,p)}$. In this case, $n_{PUCCH}^{(2,p)}$ is configured UE-specifically and is configured for each cell by upper layer signaling. If contention occurs between a CSI and an active SR in the same subframe, the CSI is dropped.

In a TDD periodic CQI/PMI reporting, a period value is applied in accordance with TDD UL/DL configuration as follows.

First of all, a reporting period '$N_{pd}=1$' is applied to TDD UL/DL configurations 0, 1, 3, 4 and 6 only. In this case, all UL subframes of a radio frame are used for the CQI/PMI reporting.

A reporting period '$N_{pd}=5$' is applied to TDD UL/DL configurations 0, 1, 2 and 6 only.

A reporting period '$N_{pd}=\{10, 20, 40, 80, 160\}$' is applicable to all TDD UL/DL configurations.

In a serving cell having $N_{RB}^{DL}\leq 7$, Mode 2-0 and Mode 2-1 are not supported.

Table 17 shows a subsampling codebook of PUCCH mode 1-1 submode 2. In this case, $i_1$ indicates a 1$^{st}$ PMI and $i_2$ indicates a 2$^{nd}$ PMI.

TABLE 17

| | $i_1$ | | $i_2$ | | total |
|---|---|---|---|---|---|
| RI | #bits | values | #bits | values | #bits |
| 1 | 3 | {0, 2, 4, 6, 8, 10, 12, 14}. | 1 | {0, 2} | 4 |
| 2 | 3 | {0, 2, 4, 6, 8, 10, 12, 14} | 1 | {0, 1} | 4 |
| 3 | 1 | {0, 2} | 3 | {0, 1, 2, 3, 8, 9, 10, 11} | 4 |
| 4 | 1 | {0, 1} | 3 | {0, 1, 2, 3, 4, 5, 6, 7} | 4 |
| 5 | 2 | {0, 1, 2, 3} | 0 | {0} | 2 |

TABLE 17-continued

| | $i_1$ | | $i_2$ | | total |
|---|---|---|---|---|---|
| RI | #bits | values | #bits | values | #bits |
| 6 | 2 | {1, 1, 2, 3} | 0 | {0} | 2 |
| 7 | 2 | {0, 1, 2, 3} | 0 | {0} | 2 |
| 8 | 0 | {0} | 0 | {0} | 0 |

Table 18 shows a joint encoding of PUCCH mode 1-1 submode 1. In this case, $i_1$ indicates a 1$^{st}$ PMI.

TABLE 18

| hypotheses | RI | $i_1$ values |
|---|---|---|
| 0-7 | 1 | {0, 2, 4, 6, 8, 12, 14} |
| 8-15 | 2 | {0, 2, 4, 6, 8, 12, 14} |
| 16-17 | 3 | {0, 2} |
| 18-19 | 4 | {0, 2} |
| 20-21 | 5 | {0, 2} |
| 22-23 | 6 | {0, 2} |
| 24-25 | 7 | {0, 2} |
| 26 | 8 | {0} |
| 27-31 | reserved | NA |

Table 19 shows a subsampling codebook of PUCCH mode 2-1. In this case, $i_2$ indicates a 2$^{nd}$ PMI.

TABLE 19

| | $i_2$ | |
|---|---|---|
| RI | #bits | values |
| 1 | 4 | No subsampling |
| 2 | 2 | {0, 2, 4, 6} |
| 3 | 2 | {2, 3, 10, 11} |
| 4 | 2 | {0, 2, 4, 6} |
| 5 | 0 | {0} |
| 6 | 0 | {0} |
| 7 | 0 | {0} |
| 8 | 0 | {0} |

An RI reporting for a serving cell in periodic report mode is valid for the CQI/PMI reporting for the serving cell in periodic CSI report mode.

CQI/PMI calculation is performed conditionally for a lowest possible RI given by a bitmap parameter 'codebookSubsetRestriction' if it is conditioned for a last reported RI or there is no last reported RI. If a reporting for at least one CSI subframe set is configured, CQI/PMI is calculated conditionally for a last reported RI linked to the same subframe of a CQI/PMI reporting.

Wideband Feedback

1) Mode 1-0

Looking into an RI reported subframe (transmitted in transmission mode 3 only), a user equipment determines an RI on the assumption of a subband set (S) transmission and then makes a report of a reporting type 3 including one RI.

Looking into a CQI reported subframe, a user equipment makes a report of a reporting type 4 including one WB CQI value calculated on the assumption of a subband set (S). In transmission mode 3, a CQI is calculated conditionally for a last reported periodic RI. In another transmission mode, a CQI is calculated conditionally for a rank 1 transmission.

2) Mode 1-1

Looking into an RI reported subframe (transmitted in transmission mode 4, 8 or 9 only), a user equipment determines an RI on the assumption of a subband set (S) transmission and then makes a report of a reporting type 3 including one RI.

Looking into a subframe in which an RI and a $1^{st}$ PMI are reported (transmitted only if a CSI-RS port is configured in submode 1 of transmission mode 9), a user equipment determines an RI on the assumption of a subband set (S) transmission and then makes a report of a reporting type 5 including the RI and the $1^{st}$ PMI, which are joint encoded in accordance with a single precoding matrix selected from a codebook subset on the assumption of the subband set (S) transmission.

Looking into a CQI/PMI reported subframe, a single precoding matrix is selected from a codebook subset on the assumption of a subband set (S) transmission. And a user equipment can makes a report of type 2/2b/2c. In doing so, a single WB CQI value, which is calculated on the assumption of the subband set (S) transmission and a use of a single precoding matrix in every subband, is included. Moreover, in case of a transmission mode 4 or a transmission mode 8, a user equipment can make a report of a type 2 configured with a selected single $2^{nd}$ PMI. In case of a submode 1 of a transmission mode 9, a user equipment can make a report of a type 2b configured with a selected single $1^{st}$ PMI. In case of a submode 2 of a transmission mode 9, a user equipment can make a report of a type 2c configured with $1^{st}$ and $2^{nd}$ PMIs in accordance with a single selected precoding matrix. If RI>1, a WB CQI having a 3-bit spatial difference can be reported.

In transmission mode 4, 8 or 9, PMI and CQI are calculated conditionally for a last reported periodic RI. In case of another transmission mode, they are calculated conditionally for a rank 1 transmission.

UE Selected Subband Feedback

1) Mode 2-0

Looking into an RI reported subframe (transmitted in transmission mode 3 only), a user equipment determines an RI on the assumption of a subband set (S) transmission and then makes a report of a reporting type 3 including one RI.

Looking into a WB CQI reported subframe, a user equipment makes a report of a reporting type 4 including one WB CQI value calculated on the assumption of a subband set (S). In transmission mode 3, a CQI is calculated conditionally for a last reported periodic RI. In another transmission mode, a CQI is calculated conditionally for a rank 1 transmission.

Looking into an SB CQI reported subframe, a user equipment selects a preferred optimal one (Best-1) from J BPs configured with N subband sets [cf. Table 15] and is then able to make a report of a reporting type 1 including one CQI value that reflects a selected subband transmission of the BP determined in accordance with a preferred subband indicator L. A reporting type 1 for each BP may be alternately reported. If RI>1, a CQI indicates a channel quality of a $1^{st}$ codeword. A preferred subband selection in transmission mode 3 and a CQI value are calculated conditionally for a last reported periodic RI. In another transmission mode, a CQI is calculated conditionally for a rank 1 transmission.

2) Mode 2-1

Looking into an RI reported subframe (transmitted only if the number of configured CSI-RS ports is 2 or 4 in transmission mode 4, 8 or 9), a user equipment determines an RI on the assumption of a subband set (S) transmission and then makes a report of a reporting type 3 including one RI.

Looking into a subframe, in which an RI is reported in transmission mode 9 when the number of CSI-RS ports is 8, a user equipment determines an RI on the assumption of a subband set (S) transmission, determines a PTI (precoder type indicator), and then makes a report of a report type 6 including one RI and PTI.

Looking into a WB CQI/PMI reported subframe, a single precoding matrix is selected from a codebook subset on the assumption of a subband set (S) transmission. Except a transmission mode 9, a user equipment can make a report of a type 2. In doing so, a single WB CQI value, which is calculated on the assumption of the subband set (S) transmission and a use of a single precoding matrix in every subband, and a single selected PMI are included. Moreover, if RI>1, a WB CQI having a 3-bit spatial difference can be reported.

In case of a transmission mode 9, a user equipment can make a report of a reporting type 2a if PTI=0. If PTI=1 or the number of CSI-RS ports is set to 2 or 4, the user equipment can make a report of a reporting type 2b. In doing so, if PTI=0, a $1^{st}$ PMI is included in accordance with a single selected precoding matrix. On the other hand, if PTI=1, a single WB CQI value, which is calculated on the assumption of the subband set (S) transmission and a use of a single precoding matrix in every subband, and a $2^{nd}$ PMI in accordance with the single selected precoding matrix are included. When PTI=1, if RI>1, a WB CQI having a 3-bit spatial difference can be reported.

In a transmission mode 4, 8 or 9, PMI and CQI are calculated conditionally for a last reported periodic RI. In case of other transmission modes, they are calculated conditionally for a rank 1 transmission.

Looking into a UE-selected SB CQI reported subframe, a user equipment selects a preferred optimal one (Best-1) from J BPs configured with N subband sets [cf. Table 15] and is then able to make a report of a reporting type 1 including a CQI value for a codeword 0 that reflects a selected subband transmission of the BP determined in accordance with a preferred subband indicator L. If RI>1, an SB CQI having an additional 3-bit spatial difference for an offset level of a codeword 1 can be reported. In doing so, the offset level of the codeword 1 indicates a difference of an SB CQI index for the codeword 1 from an SB CQI index for the codeword 0 and an SB CQI can be calculated on the assumption of a subband set (S) transmission and a use of a single precoding matrix in every subband.

In case of the transmission mode 9 having the CSI-RS port number set to 8, if PTI=0, a user equipment can make a report of a reporting type 2b. In doing so, a WB CQI value calculated on the assumption of a subband set (S) transmission and a use of a single precoding matrix in every subband and a $2^{nd}$ PMI of a preferred precoding matrix selected from a codebook set on the assumption of the subband set (S) transmission are included. If RI>1, an SB CQI having an additional 3-bit spatial difference for an offset level of a codeword 1 can be reported. In doing so, the offset level of the codeword 1 indicates a difference of an SB CQI index for the codeword 1 from an SB CQI index for the codeword 0 and an SB CQI can be calculated on the assumption of the subband set (S) transmission and a use of the single precoding matrix in every subband.

If PTI=1 in transmission mode 9, a user equipment can make a report of a reporting type 1a per BP. In doing so, a CQI value for a codeword 0, which reflects a selected subband transmission of a BP determined in accordance with a preferred subband indicator L, is included. And, a $2^{nd}$ PMI of a preferred precoding matrix selected from a codebook set on the assumption of the selected subband transmission of the BP determined in accordance with the determined preferred subband indicator L is included. If RI>1, an SB CQI having an additional 3-bit spatial difference for an offset level of the codeword 1 can be reported. In doing so, the offset level of the codeword 1 indicates a difference of an SB CQI index for the codeword 1 from an SB CQI index for the codeword 0 and an SB CQI can be calculated on the assumption of the subband set (S) transmission and a use of the single precoding matrix in every subband.

The subband selection and CQI in transmission mode 4, 8 or 9 are calculated conditionally for a last reported periodic WB PMI and RI. In other transmission modes, they are calculated conditionally for a last reported PMI and a rank 1 transmission.

Meanwhile, when a parameter 'ttiBundling' provided by an upper layer is set to TRUE, if there occurs contention between UL-SCH and a periodic CSI report in the course of a subframe bundling operation, a user equipment can drop the periodic CSI report of a PUCCH reporting type determined in a corresponding subframe. And, the user equipment may not multiplex a PUSCH transmission and a periodic CSI report payload with each other in a corresponding subframe.

3. Channel State Information Transmitting Method

If a MAC control element for the activation/deactivation of an S cell if received in an $n^{th}$ subframe, a user equipment activated/deactivated in an $(n+x)^{th}$ subframe (e.g., x=8). In this case, the activation means one of a PDCCH monitoring, a sounding reference signal (RSR) transmission, a CSI measurement for a newly activated S cell, a scheduling start of a user equipment in a newly activated S cell of eNB and the like. On the contrary, the deactivation means the release of a procedure for the above-described activation.

Thus, when the activation/deactivation procedure is performed, it causes a problem related to a periodic CSI report. While a reporting period for an S cell is set in advance through RRC signaling, the problem related to the periodic CSI report may be caused if a reporting timing is equal to or ahead of a timing at which a CSI resource (e.g., CRS (common reference signal), CSI-RS, etc.) available for measuring a CSI is present or a user equipment is unable to generate a valid CSI information.

Moreover, although a user equipment having received an activation/deactivation message through MAC control element sends ACK/NACK in response to the received message, if a base station fails in receiving the ACK/NACK, the above problem may be caused. For instance, after a base station has sent an activation message, although a user equipment decodes a corresponding signal and then sends an ACK message, if the base station fails in receiving the ACK message, the user equipment performs a periodic CSI report for an active cell. In doing so, the above-mentioned problem may be caused. In this case, if a periodic CSI information is piggybacked on PUSCH, since the base station does not receive an ACK signal for a MAC control element, the base station may perform a decoding on the assumption that PUSCH is configured with data only, which is different from the actually UE-transmitted PUSCH configured with CSI and traffic data. When the user equipment simultaneously transmits CSI and data on PUSCH, since the CSI is mapped to a resource element and the data is then mapped, a starting point of a data region varies depending on a CSI bit size. Hence, the base station has to perform a blind decoding to search for the starting point of the data region or perform an unnecessary HARQ processing. As a solution for such a problem, a scheme has been proposed as follows. First of all, a periodic report is performed to have a fixed starting point of the data region not based on an activation cell but based on a configured cell. Secondly, CSI bits for a deactivated cell are transmitted by being configured with dummy bits.

Yet, the above-mentioned solution is effective only if periodicity of a periodic CSI report of each configured cell is always different. If contention occurs between periodic CSI report times (timings) in at least two cells, a problem may be caused. In particular, when a base station fails in receiving ACK/NACK for an activation/deactivation MAC control element, if a user equipment performs a periodic CSI report for an activation/deactivation message received cell through MAC control element, the base station may determine it as a periodic CSI report for another activated cell, which increases a rank adaptation mismatch or the count of blind decoding for obtaining CSI information). Moreover, such a problem may get worse since a CSI bit size varies depending on an information type of a CSI reported in each cell. In particular, if a CSI information is piggybacked on PUSCH, the number of occupied resource elements (REs) varies depending on a CSI bit size expected to receive by a base station and a UE-transmitted CSI bit size, which results in vagueness in that a starting point of a data region of a UE-transmitted PUSCH is different from a starting point of a data region of a PUSCH expected by a base station. Thus, the vagueness of a starting point of a data region of PUSCH may cause malfunction of a base station, the incremented count of blinding decoding for decoding data and the vagueness of a buffer size.

Figure 30:
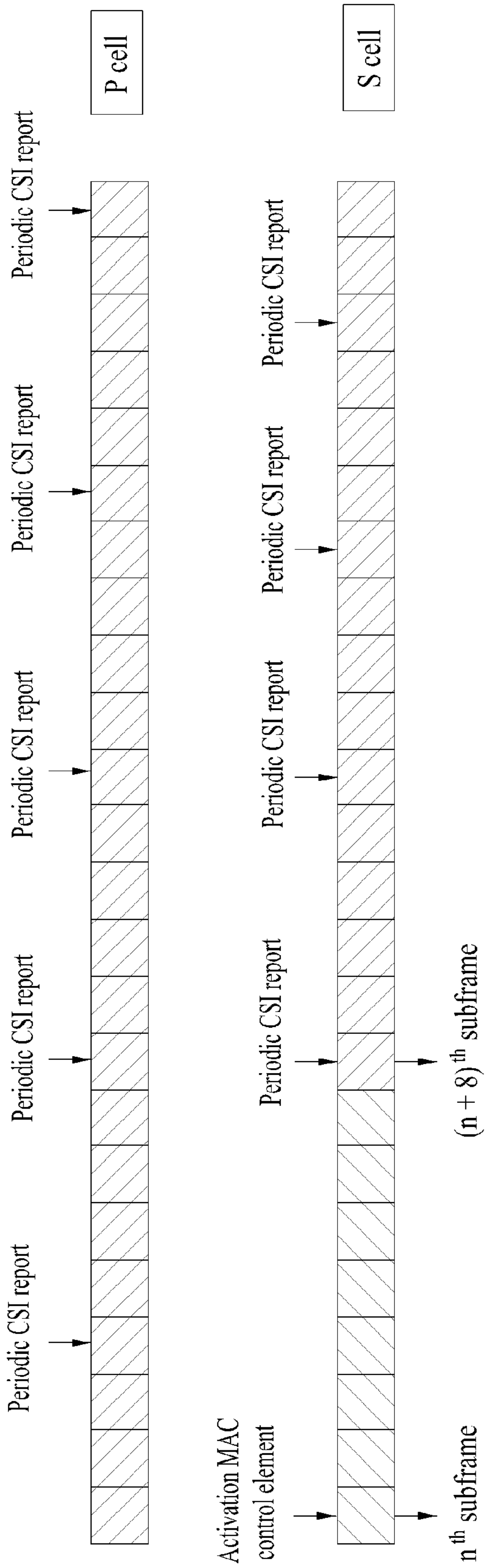
FIG. 30 is a diagram for one example of a periodic CSI report in case that a user equipment receives an activation message for S cell.

FIG. 30 is a diagram for one example of a periodic CSI report in case that a user equipment receives an activation message for S cell.

Referring to FIG. 30, if a user equipment receives an activation MAC control element for an S cell in an $n^{th}$ subframe, the user equipment can perform a periodic CSI report in an $(n+8)^{th}$ subframe behind. In doing so, if both a periodic CSI report for the S cell and a periodic CSI report for a P cell should be simultaneously performed, as shown in FIG. 30, the user equipment compares a priority of a CSI information of the P cell and a priority of a CSI information of the S cell to each other and then makes a report of the CSI information having a higher priority. In doing so, as mentioned in the foregoing description, the reporting type 3, 5, 6 or 2a has a $1^{st}$ priority, the reporting type 2, 2b, 2c or 4 has a $2^{nd}$ priority, and the reporting type 1 or 1a has a $3^{rd}$ priority. If the CSI information for the S cell has the $1^{st}$ priority, the user equipment transmits a CSI for the S cell on PUCCH or PUSCH. Yet, if a base station fails in receiving ACK/NACK information on the MAC control element from the user equipment, the base station misunderstands the CSI information received from the user equipment as the CIS information for the P cell instead of the CSI information for the S cell. Hence, if a CSI information bit size of the S cell is different from that of the P cell, the base station performs erroneous decoding on the UE-transmitted CSI information or may perform the blind decoding on the UE-transmitted CSI information several times. Moreover, in case that CSI information is transmitted in a manner of being piggybacked on PUSCH, the number of resource elements in PUSCH region occupied by the CSI information varies due to the difference in the CSI information bit size. Since such a problem prevents the base station from knowing a starting point of a data region transmitted on PUSCH, the base station should perform blind decoding several times to decode data.

In order to solve the above-mentioned problems, the present invention proposes a method of transmitting channels state information. For clarity of the following description, a case of contention between a periodic CSI report timing for a P cell and a periodic CSI report timing for an S cell is described for example. Yet, it is a matter of course that the present invention is identically applicable to a case of periodic CSI report timing contention between P cell and at least two S cells or a case of periodic CSI report timing contention between at least two S cells.

3.1. Channel State Information Transmitting Method

Figure 31:
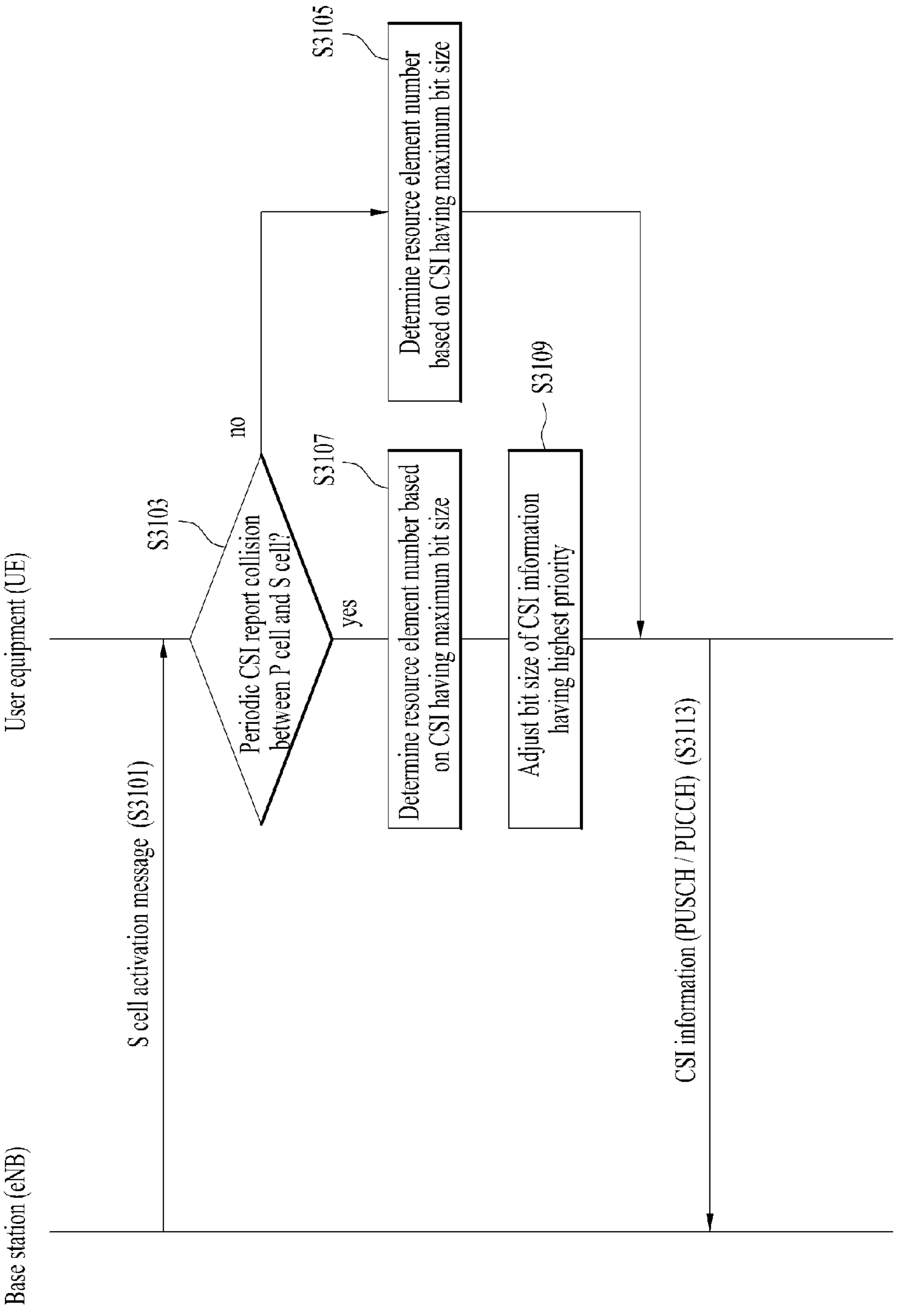
FIG. 31 is a diagram of a channel state information transmitting method according to one embodiment of the present invention.

FIG. 31 is a diagram of a channel state information transmitting method according to one embodiment of the present invention.

Referring to FIG. 31, a base station (eNB) sends an activation message for an S cell to a user equipment (UE) [S1301]. As mentioned in the foregoing description, the activation message can be sent to the user equipment through a MAC control element. Having received the activation message, the user equipment measures a CSI for a newly activated S cell.

In case of performing a periodic CSI report based on a configured cell, the user equipment determines whether a timing of a periodic CSI report for a P cell and a timing of a periodic CSI report for an S cell collides with each other [S3103].

If the timing of the periodic CSI report for the P cell and the timing of the periodic CSI report for the S cell do not collide with each other in the step S3103, the user equipment determines a resource element depending on a CSI bit size measured per cell [S3105]. In particular, the user equipment determines the number of resource elements transmitted in case of reporting a CSI for the P cell depending on a CSI bit size for the P cell. And, the user equipment determines the number of resource elements transmitted in case of reporting a CSI for the S cell depending on a CSI bit size for the S cell.

If the timing of the periodic CSI report for the P cell and the timing of the periodic CSI report for the S cell collide with each other in the step S3103, the user equipment calculates a CSI bit size for each of the cells (e.g., P cell and S cell) and then determines the number of resource elements based on the CSI bit size having a maximum size [S3107]. A method for the user equipment to determine the number of the resource elements shall be described in detail with reference to '3.2.' later.

Having determined the number of the resource elements adjusts a bit size of the CSI information of a highest priority in the configured cell [S3109]. In doing so, as mentioned in the foregoing description, the bit size is determined depending on a reporting type and a priority of the CSI report is determined depending on the reporting type. A method for the user equipment to adjust the bit size of the CSI information depending on the determined number of the resource elements shall be described in detail with reference to '3.3.' later.

The user equipment maps the CSI information to the resource element and then transmits it to the base station on PUSCH or PUCCH [S3113].

In particular, when a CSI is transmitted in an $n^{th}$ subframe, if at least one serving cell is configured, the user equipment performs a periodic CSI report through PUCCH of the P cell. Yet, if the user equipment transmits data in the $n^{th}$ subframe through PUSCH of the P cell, the CSI can be transmitted through the PUSCH of the P cell together with the data. Moreover, although the user equipment dopes not transmit data in the $n^{th}$ subframe through PUSCH of the P cell but transmits data through PUSCH of at least one S cell, CSI can be transmitted through the PUSCH of the S cell having a smallest index (or cell ID) together with the data.

As mentioned in the foregoing description of the step S3105, if the timing of the periodic CSI report for the P cell and the timing of the periodic CSI report for the S cell do not collide with each other, the user equipment can transmit each CSI depending on the reporting timing of the CSI for each of the cells. As mentioned in the foregoing description of the steps S3107 and S3109, if the timing of the periodic CSI report for the P cell and the timing of the periodic CSI report for the S cell collide with each other, the user equipment can transmit the CSI information having a high priority to the base station only.

3.2. Determining Resource Element Number

When a user equipment transmits CQI (or PMI) information bits on PUSCH, the number of resource elements for CQI (or PMI) per layer can be calculated as Formula 10. In this case, the number of resource elements for CQI (or PMI) can be expressed as the number Q' of coded modulation symbols.

[Formula 10]

$$Q' = \min\left(\left\lceil \frac{(O+L)\cdot M_{sc}^{PUSCH-initial}\cdot N_{symb}^{PUSCH-initial}\cdot \beta_{offset}^{PUSCH}}{\sum_{r=0}^{C^{(x)}-1} K_r^{(x)}} \right\rceil, M_{sc}^{PUSCH}\cdot N_{symb}^{PUSCH} - \frac{Q_{RI}}{Q_m}\right)$$

In Formula 10, the O indicates the bit number of CQI/PMI. The L indicates the CRC (cyclic redundancy check) bit number. The L has a value of 0 if the O is equal to or smaller than 11 bits. Otherwise, the L has a value of 8. In particular, $$L = \begin{cases} 0 & O \le 11 \\ 8 & \text{otherwise.} \end{cases}$$

The $\beta_{offset}^{CQI}$ is determined depending on the number of the transmitted codewords for a corresponding uplink cell. And, a parameter for setting an offset value to consider an SNR (signal to noise ratio) difference between data and uplink control information (UCI) is determined as $\beta_{offset}^{PUSCH}=\beta_{offset}^{CQI}$.

The $M_{sc}^{PUSCH}$ represents a bandwidth assigned (scheduled) for a PUSCH transmission in a current subframe for a transport block as a subcarrier. The $N_{symb}^{PUSCH}$ indicates the number of SC-FDMA symbols in a subframe in which a current PUSCH is transmitted.

The $N_{symb}^{PUSCH-initial}$ indicates the number of SC-FDMA symbols per subframe for an initial PUSCH transmission for the same transport block and the $M_{sc}^{PUSCH-initial}$ indicates the number of subcarriers. The x in $K_r^{(x)}$ indicates an index of a transport block having a highest MCS (modulation and coding scheme) designated by a UL grant. In case that two transport blocks have the same MCS in accordance with an initial UL grant, it is 'x=1', which corresponds to a $1^{st}$ transport block.

The $M_{sc}^{PUSCH-initial}$, C and $K_r^{(x)}$ can be obtained from an initial PDCCH for the same transport block as above. If they are not included in the initial PDCCH (DCI format 0), they can be determined in another way. In particular, the $M_{sc}^{PUSCH-initial}$, C and $K_r^{(x)}$ can be determined from PDCCH that indicates a semi-persistent scheduling most recently when the initial PUSCH for the same transport block is semi-persistently scheduled. Moreover, the $M_{sc}^{PUSCH-initial}$, C and $K_r^{(x)}$ can be determined from a random access response grant for the same transport block when PUSCH is initialized by a random access response grant.

Using Formula 10, the number of resource elements, which are occupied by a CSI when piggybacked on PUSCH, can be found based on a value having a largest bit size among CSI bit sizes of configured cells having a periodic CSI report time (timing) in the same subframe. In particular, the O value can be used as a maximum value in the number of CQI/PMI bits in each of the configured cells.

Meanwhile, when a CSI information transmission using PUCCH is performed, in order to decrease a blind decoding count of a base station, it is able to determine a bitstream size for channel coding using (20,A) RM code based on a value having a largest bit size among CSI bit sizes for each configured cell having a periodic CSI report time (timing) in a corresponding subframe.

As mentioned in the foregoing description, if a periodic CSI report is performed based on a configured cell, it is able to determine a resource element piggybacked on PUSCH based on a value having a largest bit size among CSI bit sizes for each configured cell having a periodic report time (timing) in a corresponding subframe. Hence, irrespective of whether a base station normally receives ACK/NACK information on a MAC control element, the number of resources for piggybacking CSI on PUSCH is fixed and the vagueness for a data starting point in the PUSCH is cleared.

3.3. CSI Information Bit Size Adjustment

As mentioned in the foregoing description, since the O value is set to a value having a largest bit size among CSI bit sizes, a user equipment can use a bit size re-sizing method or a rate matching method to match a bit size of CSI information having a highest priority among configured cells having periodic CSI report times (timings) in a corresponding subframe to the O value. In doing so, as mentioned in the foregoing description, the PUCCH format type 3, 5, 6, or 2a has a $1^{st}$ priority, the PUCCH format type 2, 2b, 2c or 4 has a $2^{nd}$ priority, and the PUCCH format type 1 or 1a has a $3^{rd}$ priority.

FIG. 32 is a diagram of a CSI bit size adjusting method according to one embodiment of the present invention.

FIG. 32 (*a*) shows a bit size re-sizing method for adjusting a CSI bit size. And, FIG. 32 (*b*) shows a rate matching method for adjusting a CSI bit size.

Referring to FIG. 32 (*a*), in order to match a bit size of CSI information having a highest priority to a value having a largest bit size among configured cells having periodic CSI report times (timings) in a same subframe, '1 (one)' or '0 (zero)' can be padded before or after a CSI bit (CSI bit having a highest priority) to be transmitted. For instance, if the 0 value is 10 bits and a size of a CSI bit having a highest priority is 8 bits, it is able to match a size for the O value in a manner of padding '0' or '1' of 2 bits before or after the size of the CSI bit having the highest priority. The case shown in FIG. 32 (*a*) corresponds to one example for a case of padding 2-bit zero (0).

Referring to FIG. 32 (*b*), in order to adjust a bit size, it is able to perform a circular buffer rate matching. For instance, if the 0 value is 10 bits and a size of a CSI bit having a highest priority is 8 bits, a head part of a size of the CSI bit having the highest priority is copied by a difference (i.e., 2 bits) between the O value and the size of the CSI bit of the highest priority and then added to a tail part of the CSI bit.

4. The General of the Invention Applicable Device

Figure 33:
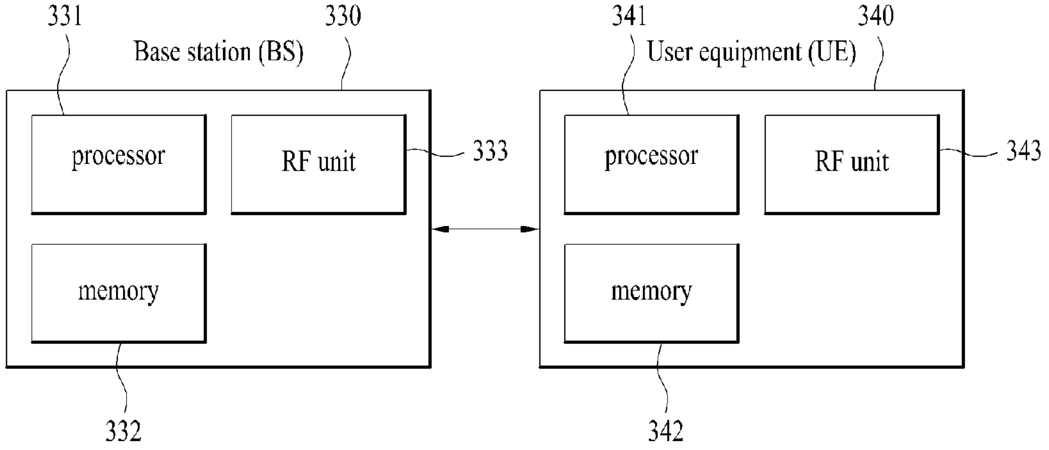
FIG. 33 is a block diagram of a wireless communication device according to one embodiment of the present invention.

FIG. 33 is a block diagram of a wireless communication device according to one embodiment of the present invention.

Referring to FIG. 33, a wireless communication system includes a base station BS 330 and a plurality of user equipments UEs 340 located within an area of the base station 330.

The base station 330 includes a processor 331, a memory 332 and an RF (radio frequency) unit 333. The processor 331 implements the proposed functions, processes and/or methods. Layers of a radio interface protocol can be implemented by the processor 331. The memory 332 is connected to the processor 331 and then stores various kinds of information to drive the processor 331. The RF unit 333 is connected with the processor 331 and then transmits and/or receives radio or wireless signals.

The user equipment 340 includes a processor 341, a memory 342 and an RF unit 343. The processor 341 implements the proposed functions, processes and/or methods. Layers of a radio interface protocol can be implemented by the processor 341. The memory 342 is connected to the processor 341 and then stores various kinds of information to drive the processor 341. The RF unit 343 is connected with the processor 341 and then transmits and/or receives radio or wireless signals.

The memory 332/342 may be provided within or outside the processor 331/341. And, the memory 332/342 may be connected to the processor 331/341 via various kinds of well-known means. Moreover, the base station 330 and/or the user equipment 340 may have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, embodiments of the present invention are described centering on the data transmission/reception relations between a base station and a user equipment. In this disclosure, a specific operation explained as performed by a base station may be performed by an upper node of the base station in some cases. In particular, in a network constructed with a plurality of network nodes including a base station, it is apparent that various operations performed for communication with a user equipment may be performed by a base station or other networks except the base station. In this case, 'base station' can be replaced by such a terminology as a fixed station, a Node B, an eNode B (eNB), an access point and the like. And, 'terminal' may be replaced by such a terminology as a user equipment (UE), a user equipment (MS), a mobile subscriber station (MSS)' and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

As mentioned in the foregoing description, the detailed descriptions for the preferred embodiments of the present invention may be provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A data transceiving method in a wireless access system according to the present invention mentioned in the foregoing description is applicable to various kinds of wireless access systems as well as to 3GPP LTE system.

What is claimed is:

1. A method of transmitting a channel state information (CSI) in a wireless access system supporting multiple cells, the method comprising:

calculating a number of resource elements (REs) using a maximum bit size among a bit size of the CSI for a first cell and a bit size of the CSI for a second cell, when a timing of a periodic CSI report for the first cell and a timing of a periodic CSI report for the second cell collide with each other;

adjusting bits of the CSI having a higher priority between the CSI for the first cell and the CSI for the second cell to match the maximum bit size; and transmitting the adjusted bits of the CSI having the higher priority to a base station in a manner of mapping the adjusted bits to the calculated REs, wherein the calculating the number of the REs includes calculating a number (Q') of the REs by a formula, wherein the formula is represented as follows:

$$Q' = \min\left(\left\lceil \frac{(O+L)\cdot M_{sc}^{PUSCH-initial}\cdot N_{symb}^{PUSCH-initial}\cdot \beta_{offset}^{PUSCH}}{\sum_{r=0}^{C^{(x)}-1} K_r^{(x)}} \right\rceil, M_{sc}^{PUSCH}\cdot N_{symb}^{PUSCH} - \frac{Q_{RI}}{Q_m}\right) \quad \langle\text{Formula}\rangle$$

and wherein O indicates a bit number of the CSI, L indicates a cyclic redundancy check (CRC) bit number, $\beta_{offset}^{PUSCH}$ is determined depending on a number of transmitted codewords for a corresponding uplink cell to consider an signal to noise ratio (SNR) difference between data and uplink control information (UCI), $M_{sc}^{PUSCH}$ represents a bandwidth assigned for a physical uplink shared channel (PUSCH) transmission in a current subframe for a transport block as a subcarrier, $N_{symb}^{PUSCH}$ indicates a number of single-carrier frequency-division multiple access (SC-FDMA) symbols in a subframe in which a current PUSCH is transmitted, $N_{symb}^{PUSCH-initial}$ indicates a number of SC-FDMA symbols per subframe for an initial PUSCH transmission for a same transport block, $M_{sc}^{PUSCH-initial}$ indicates a number of subcarriers, x in $K_r^{(x)}$ indicates an index of a transport block having a highest modulation and coding scheme (MCS) designated by a UL grant, $Q_m$ is a modulation order of a given transport block, and $Q_{RI}$ is a number of coded bits for the CSI.

2. The method of claim 1, the adjusting comprising:

adjusting the bits of the CSI having the higher priority to match the maximum bit size in a manner of padding bits amounting to a difference from the maximum bit size before and after the bits of the CSI having the higher priority.

3. The method of claim 1, the adjusting comprising:

adjusting the bits of the CSI having the higher priority to match the maximum bit size in a manner of copying a portion of the bits of the CSI having the higher priority by a difference between the bits of the CSI having the higher priority and the maximum bit size and then adding the copied portion to the bits of the CSI having the higher priority.

4. The method of claim 1, the transmitting comprising:

transmitting the CSI having the higher priority on the PUSCH or a physical uplink control channel (PUCCH).

5. The method of claim 1, wherein the priority is determined depending on which information selected from the group consisting of a channel quality indication (CQI), a precoding matrix indication (PMI), a rank indication (RI) and a precoder type indication (PTI) is included in the periodic CSI report.

6. A user equipment for transmitting a channel state information (CSI) in a wireless access system supporting multiple cells, the user equipment comprising:

a transceiver configured to transceive a wireless signal; and a processor which is configured to:

calculate a number of resource elements (REs) using a maximum bit size among a bit size of the CSI for a first cell and a bit size of the CSI for a second cell, when a timing of a periodic CSI report for the first cell and a timing of a periodic CSI report for the second cell collide with each other, adjust bits of the CSI having a higher priority between the CSI for the first cell and the CSI for the second cell to match the maximum bit size, and transmit the adjusted bits of the CSI having the higher priority to a base station in a manner of mapping the adjusted bits to the calculated REs, wherein the processor calculates the number (Q') of the REs by a formula, wherein the formula is represented as follows:

$$Q' = \min\left(\left\lceil \frac{(O+L)\cdot M_{sc}^{PUSCH-initial}\cdot N_{symb}^{PUSCH-initial}\cdot \beta_{offset}^{PUSCH}}{\sum_{r=0}^{C^{(x)}-1} K_r^{(x)}} \right\rceil, M_{sc}^{PUSCH}\cdot N_{symb}^{PUSCH} - \frac{Q_{RI}}{Q_m}\right), \quad \text{(Formula)}$$

and wherein O indicates a bit number of the CSI, L indicates a cyclic redundancy check (CRC) bit number, $\beta_{offset}^{PUSCH}$ is determined depending on a number of transmitted codewords for a corresponding uplink cell to consider an signal to noise ratio (SNR) difference between data and uplink control information (UCI), $M_{sc}^{PUSCH}$ represents a bandwidth assigned for a physical uplink shared channel (PUSCH) transmission in a current subframe for a transport block as a subcarrier, $N_{symb}^{PUSCH}$ indicates a number of single-carrier frequency-division multiple access (SC-FDMA) symbols in a subframe in which a current PUSCH is transmitted, $N_{symb}^{PUSCH-initial}$ indicates a number of SC-FDMA symbols per subframe for an initial PUSCH transmission for a same transport block, $M_{sc}^{PUSCH-initial}$ indicates a number of subcarriers, x in $K_r^{(x)}$ indicates an index of a transport block having a highest modulation and coding scheme (MCS) designated by a UL grant, $Q_m$ is a modulation order of a given transport block, and $Q_{RI}$ is a number of coded bits for the CSI.

7. The user equipment of claim 6, wherein the processor adjusts the bits of the CSI having the higher priority to match the maximum bit size in a manner of padding bits amounting to a difference from the maximum bit size before and after the bits of the CSI having the higher priority.

8. The user equipment of claim 6, wherein the processor adjusts the bits of the CSI having the higher priority to match the maximum bit size in a manner of copying a portion of the bits of the CSI having the higher priority by a difference between the bits of the CSI having the higher priority and the maximum bit size and then adding the copied portion to the bits of the CSI having the higher priority.

9. The user equipment of claim 6, wherein the processor transmits the CSI having the higher priority on the PUSCH or a physical uplink control channel (PUCCH).

10. The user equipment of claim 6, wherein the priority is determined depending on which information selected from the group consisting of a channel quality indication (CQI), a precoding matrix indication (PMI), a rank indication (RI) and a precoder type indication (PTI) is included in the periodic CSI report.

* * * * *